(12) United States Patent
Aoki et al.

(10) Patent No.: US 8,462,594 B1
(45) Date of Patent: *Jun. 11, 2013

(54) THERMALLY-ASSISTED MAGNETIC RECORDING HEAD CAPABLE OF PREVENTING PROPAGATED LIGHT BEING ABSORBED BY MAGNETIC POLE

(75) Inventors: Susumu Aoki, Tokyo (JP); Kosuke Tanaka, Tokyo (JP); Tetsuya Roppongi, Tokyo (JP); Kei Hirata, Tokyo (JP); Takeshi Tsutsumi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,893

(22) Filed: Feb. 27, 2012

(51) Int. Cl.
*G11B 11/00* (2006.01)

(52) U.S. Cl.
USPC ..................... 369/13.33; 369/13.13

(58) Field of Classification Search
USPC .......... 369/13.33, 13.13, 13.32, 13.02, 13.17, 369/112.09, 112.14, 112.21, 112.27, 300; 360/59; 29/603.05–603.27; 385/129, 31, 385/88–94; 250/201.3, 201.5
See application file for complete search history.

(56) References Cited

U.S. PATENT DOCUMENTS

| | | | |
|---|---|---|---|
| 7,330,404 B2 | 2/2008 | Peng et al. | |
| 8,254,215 B1* | 8/2012 | Tanaka et al. | 369/13.33 |
| 8,264,920 B1* | 9/2012 | Chou et al. | 369/13.33 |
| 2010/0149930 A1* | 6/2010 | Komura et al. | 369/13.33 |
| 2010/0202256 A1* | 8/2010 | Ito et al. | 369/13.33 |
| 2010/0260015 A1 | 10/2010 | Sasaki et al. | |
| 2011/0058272 A1 | 3/2011 | Miyauchi et al. | |
| 2012/0075967 A1* | 3/2012 | Chou et al. | 369/13.33 |
| 2012/0117791 A1* | 5/2012 | Hara et al. | 29/603.07 |
| 2012/0275280 A1* | 11/2012 | Miyauchi et al. | 369/13.33 |

OTHER PUBLICATIONS

U.S. Appl. No. 13/191,913, filed Jul. 27, 2011 in the name of Chou et al.
U.S. Appl. No. 13/097,133, filed Apr. 29, 2011 in the name of Miyauchi et al.

* cited by examiner

*Primary Examiner* — Tan X Dinh
(74) *Attorney, Agent, or Firm* — Oliff & Berridge, PLC

(57) ABSTRACT

A thermally-assisted magnetic recording head includes a medium facing surface, a magnetic pole, a waveguide including a core and a cladding, and a plasmon generator. The magnetic pole is located forward of the core in the direction of travel of a magnetic recording medium. The plasmon generator is disposed between the core and the magnetic pole. The core has an evanescent light generating surface facing toward the plasmon generator. The plasmon generator has a front end face located in the medium facing surface, a flat surface facing toward the'evanescent light generating surface, and first and second side surfaces that are at a distance from each other and are located farther from the evanescent light generating surface than is the flat surface.

17 Claims, 25 Drawing Sheets

THERMALLY-ASSISTED MAGNETIC RECORDING HEAD CAPABLE OF PREVENTING PROPAGATED LIGHT BEING ABSORBED BY MAGNETIC POLE

BACKGROUND OF THE INVENTION

1. Field of the Invention

The present invention relates to a thermally-assisted magnetic recording head that includes a waveguide, a plasmon generator, and a magnetic pole, and to a method of manufacturing the same.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light for use in generating near-field light is typically guided through a waveguide, which is provided in the slider, to the plasmon generator disposed near a medium facing surface of the slider.

The plasmon generator that generates near-field light by direct irradiation with light is known to exhibit very low efficiency of transformation of the applied light into near-field light. The energy of the light applied to the plasmon generator is mostly reflected off the surface of the plasmon generator, or mostly transformed into thermal energy and absorbed by the plasmon generator. The plasmon generator is small in volume since the size of the plasmon generator is set to be equal to or smaller than the wavelength of the light. The plasmon generator therefore shows a significant increase in temperature when it absorbs the thermal energy.

Such an increase in temperature causes the plasmon generator to expand in volume and protrude from the medium facing surface. This increases the distance from the read head section and the write head section to the surface of the magnetic recording medium, thereby possibly causing degradation of the characteristics of the thermally-assisted magnetic recording head. Furthermore, an increase in temperature of the plasmon generator can degrade the magnetic property of a magnetic pole for producing a write magnetic field in the write head section, and can thereby degrade the characteristics of the write head section.

To address this problem, there has been proposed such a technology that the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons. The technology is disclosed in, for example, U.S. Patent Application Publication No. 2011/0058272 A1.

The aforementioned technology allows the light propagating through the core to be transformed into near-field light with high efficiency, and also allows the plasmon generator to be prevented from excessively increasing in temperature because the plasmon generator is not directly irradiated with the light propagating through the core.

For a thermally-assisted magnetic recording head, it is necessary that the position of occurrence of the write magnetic field and the position of occurrence of the near-field light be located in close proximity to each other in the medium facing surface. Here, the following problem arises if such a configuration is employed that the surface of the core of the waveguide and the surface of the plasmon generator face each other with a gap therebetween, and the position of occurrence of the write magnetic field and the position of occurrence of the near-field light are located in close proximity to each other. That is, in such a case, both the core and the magnetic pole need to be located near the plasmon generator. It follows that the magnetic pole is located near the core. The magnetic pole is typically made of a magnetic metal material. The presence of such a magnetic pole near the core causes the problem that part of the light propagating through the core is absorbed by the magnetic pole and the use efficiency of the light propagating through the core thereby decreases.

On the other hand, to reduce the track width of a magnetic recording medium for higher recording density, it is required that the near-field light be small in spot diameter on the magnetic recording medium. U.S. Patent Application Publication No. 2011/0058272 A1 discloses a structure that is achieved by forming a groove in a dielectric layer disposed above the top surface of the core such that the groove is V-shaped in cross section parallel to the medium facing surface, and then forming a dielectric film, a plasmon generator, and part of a magnetic pole in this order in the groove. In this structure, the plasmon generator has two sloped surfaces that form a V-shape in a cross section parallel to the medium facing surface, and an edge part formed by the two sloped surfaces intersecting each other. The edge part faces toward the top surface of the core, with a gap of a predetermined size interposed between the edge part and the top surface of the core. An end of the edge part located in the medium facing surface serves as a near-field light generating part.

In the foregoing structure, the light propagating through the core is totally reflected at the top surface of the core. This causes evanescent light to occur from the top surface of the core. Then, surface plasmons are excited at least on the edge part of the plasmon generator through coupling with the evanescent light. The surface plasmons propagate along the edge part to the near-field light generating part, and near-field light is generated from the near-field light generating part based on the surface plasmons. This structure allows the surface plasmons excited on the plasmon generator to propagate to the near-field light generating part with efficiency. This structure also allows the position of occurrence of the write magnetic field and the position of occurrence of the near-field light to be close to each other. Furthermore, since the plasmon generator is disposed between the core and the magnetic pole, it is possible to prevent part of the light propagating through the core from being absorbed by the magnetic pole.

However, the following first and second problems have been found with the aforementioned structure. The first problem will be described first. The plasmon generator in the aforementioned structure has such a configuration that the surface plasmons are not allowed to exist only on the edge part but are distributed to extend from the edge part to a portion of each of the two sloped surfaces located in the vicinity of the edge part. Consequently, the aforementioned structure causes the near-field light to have a large spot diameter on the magnetic recording medium, thereby making it difficult to reduce the track width. This is the first problem.

The second problem will now be described. In the aforementioned structure, the efficiency of transformation of the light propagating through the core into near-field light varies according to the distance between the edge part and the top surface of the core. The second problem is that when thermally-assisted magnetic recording heads are mass-produced, the distance between the edge part and the top surface of the core varies greatly from one head to another, and as a result, the efficiency of transformation of the light propagating through the core into near-field light varies greatly from one head to another. The reason for this will be described below. Typically, thermally-assisted magnetic recording heads are manufactured in the following manner. First, components of a plurality of thermally-assisted magnetic recording heads are formed on a single wafer to fabricate a substructure including a plurality of pre-head portions aligned in rows, the plurality of pre-head portions being intended to later become individual thermally-assisted magnetic recording heads. Next, the substructure is cut to separate the pre-head portions from each other into individual thermally-assisted magnetic recording heads. To manufacture the thermally-assisted magnetic recording heads having the aforementioned structure, as described previously, a groove that is V-shaped in cross section parallel to the medium facing surface is formed in the dielectric layer disposed above the top surface of the core, and then the dielectric film, the plasmon generator, and part of the magnetic pole are formed in this order in the groove. Dry etching such as ion milling or reactive ion etching is employed to form the groove. In the case of forming the components of a plurality of thermally-assisted magnetic recording heads on a single wafer, there occur great variations in the position and shape of the bottom of the groove. This causes the distance between the edge part and the top surface of the core to vary greatly from one head to another, and as a result, the efficiency of transformation of the light propagating through the core into near-field light varies greatly from one head to another.

OBJECT AND SUMMARY OF THE INVENTION

It is an object of the present invention to provide a thermally-assisted magnetic recording head including a waveguide, a plasmon generator, and a magnetic pole configured so that the surface of the core of the waveguide and the surface the plasmon generator face each other with a gap therebetween, the thermally-assisted magnetic recording head being capable of preventing part of the light propagating through the core from being absorbed by the magnetic pole, making the near-field light smaller in spot diameter on a magnetic recording medium, and reducing variations in the distance between the surface of the core and the surface of the plasmon generator from one head to another, and to provide a head gimbal assembly and a magnetic recording device that each include the thermally-assisted magnetic recording head.

A thermally-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a cladding, the core allowing light to propagate therethrough; and a plasmon generator. The magnetic pole is located forward of the core in the direction of travel of the magnetic recording medium. The plasmon generator is disposed between the core and the magnetic pole. The core has an evanescent light generating surface that generates evanescent light based on the light propagating through the core. The evanescent light generating surface faces toward the plasmon generator.

The plasmon generator has: a front end face located in the medium facing surface; a flat surface facing toward the evanescent light generating surface; and a first side surface and a second side surface that are at a distance from each other and are located farther from the evanescent light generating surface than is the flat surface. The front end face includes a near-field light generating part that generates near-field light. The flat surface is shaped like a band, parallel to the evanescent light generating surface and elongated in a first direction perpendicular to the medium facing surface. The flat surface has a first edge and a second edge that are opposite to each other in a second direction parallel to the evanescent light generating surface and the medium facing surface. The first side surface is connected to the first edge. The second side surface is connected to the second edge. The cladding includes a gap part located between the evanescent light generating surface and the flat surface.

The plasmon generator is configured so that a surface plasmon is excited on the flat surface through coupling with the evanescent light generated from the evanescent light generating surface, the surface plasmon propagates along the flat surface to the near-field light generating part, and the near-field light generating part generates the near-field light based on the surface plasmon.

In the thermally-assisted magnetic recording head of the present invention, the first side surface and the second side surface may decrease in distance from each other in the second direction with increasing distance from the evanescent light generating surface. Alternatively, the first side surface and the second side surface may be parallel to each other.

In the thermally-assisted magnetic recording head of the present invention, the front end face of the plasmon generator may be quadrilateral in shape and have a first side located closest to the evanescent light generating surface, a second side located farthest from the evanescent light generating surface, and a third side and a fourth side connecting the first and second sides to each other. In this case, the first side may have a length of 15 to 50 nm, and the second side may have a length equal to or smaller than the length of the first side. The angle formed between the first side and the third side and the angle formed between the first side and the fourth side may fall within the range of 45° to 90°. The front end face may have a length of 20 to 40 nm in a third direction perpendicular to the evanescent light generating surface.

The thermally-assisted magnetic recording head of the present invention may further include a magnetic path forming section that is made of a magnetic material and connected to the magnetic pole so as to form a magnetic path in conjunction with the magnetic pole. In this case, the magnetic path forming section may have an end face that is located in the medium facing surface such that the front end face of the plasmon generator is interposed between the end face of the magnetic path forming section and the end face of the magnetic pole.

The thermally-assisted magnetic recording head of the present invention may further include a heat sink disposed between the plasmon generator and the magnetic pole. The heat sink may be made of a material the same as that of the plasmon generator, and may be in contact with the plasmon generator. The heat sink may have a sloped surface that faces toward the magnetic pole. The distance between the sloped surface and the flat surface of the plasmon generator in the third direction perpendicular to the evanescent light generating surface may decrease with increasing proximity to the medium facing surface.

A method of manufacturing the thermally-assisted magnetic recording head of the present invention includes the steps of forming the core and part of the cladding such that the evanescent light generating surface is exposed; forming on the evanescent light generating surface a dielectric film that forms the gap part; forming the plasmon generator on the dielectric film; and forming the magnetic pole after the plasmon generator is formed.

In the method of manufacturing the thermally-assisted magnetic recording head of the present invention, the plasmon generator may be formed such that the first side surface and the second side surface decrease in distance from each other in the second direction with increasing distance from the evanescent light generating surface. Alternatively, the plasmon generator may be formed such that the first side surface and the second side surface are parallel to each other.

In the method of manufacturing the thermally-assisted magnetic recording head of the present invention, the step of forming the core and part of the cladding may include the step of evening the evanescent light generating surface and the top surface of the part of the cladding located therearound.

In the method of manufacturing the thermally-assisted magnetic recording head of the present invention, the dielectric film may be formed by physical vapor deposition.

In the method of manufacturing the thermally-assisted magnetic recording head of the present invention, the step of forming the plasmon generator may include the steps of forming a metal film on the dielectric film; and patterning the metal film by etching so that the metal film becomes the plasmon generator.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

In the thermally-assisted magnetic recording head, the manufacturing method thereof, the head gimbal assembly, and the magnetic recording device of the present invention, the plasmon generator is disposed between the core and the magnetic pole. This makes it possible to prevent part of the light propagating through the core from being absorbed by the magnetic pole.

According to the present invention, the plasmon generator has the flat surface, and surface plasmons are excited on the flat surface. This plasmon generator is capable of confining the surface plasmons within a narrower range as compared a plasmon generator having the edge part.

Consequently, as compared with the case with a plasmon generator having the edge part, the present invention allows the near-field light to be smaller in spot diameter on the magnetic recording medium.

In the present invention, the flat surface of the plasmon generator faces toward the evanescent light generating surface of the core, and the gap part is interposed between the flat surface and the evanescent light generating surface. This configuration makes it possible to reduce variations in the distance between the flat surface and the evanescent light generating surface.

As can be seen from the foregoing, the present invention makes it possible to prevent part of the light propagating through the core from being absorbed by the magnetic pole, to make the near-field light smaller in spot diameter on the magnetic recording medium, and to reduce variations in the distance between the surface of the core (the evanescent light generating surface) and the surface of the plasmon generator (the flat surface) from one head to another.

Other and further objects, features and advantages of the present invention will appear more fully from the following description.

DETAILED DESCRIPTION OF THE PREFERRED EMBODIMENT

Figure 6:
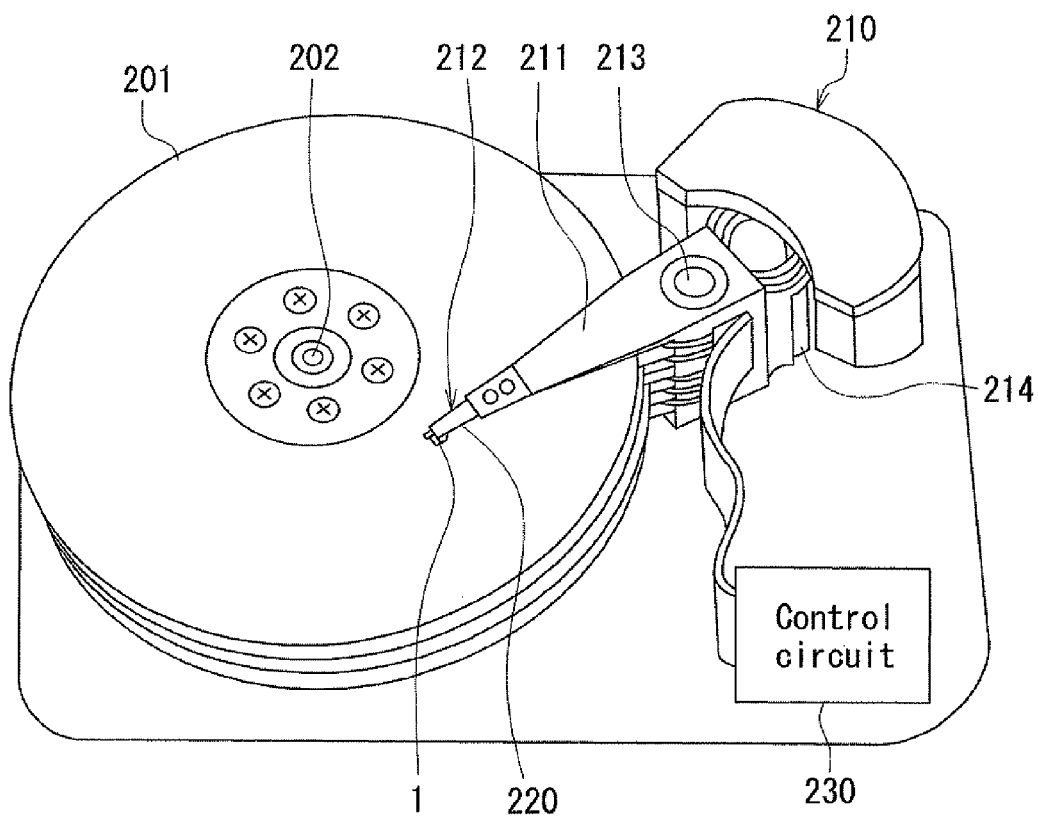
FIG. 6 is a perspective view showing a magnetic recording device according to the embodiment of the invention.

A preferred embodiment of the present invention will now be described in detail with reference to the drawings. First, reference is made to FIG. 6 to describe a magnetic disk drive that functions as a magnetic recording device according to the embodiment of the invention. As shown in FIG. 6, the magnetic disk drive includes a plurality of magnetic disks 201 serving as a plurality of magnetic recording media, and a spindle motor 202 for rotating the magnetic disks 201. The magnetic disks 201 of the embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 7:
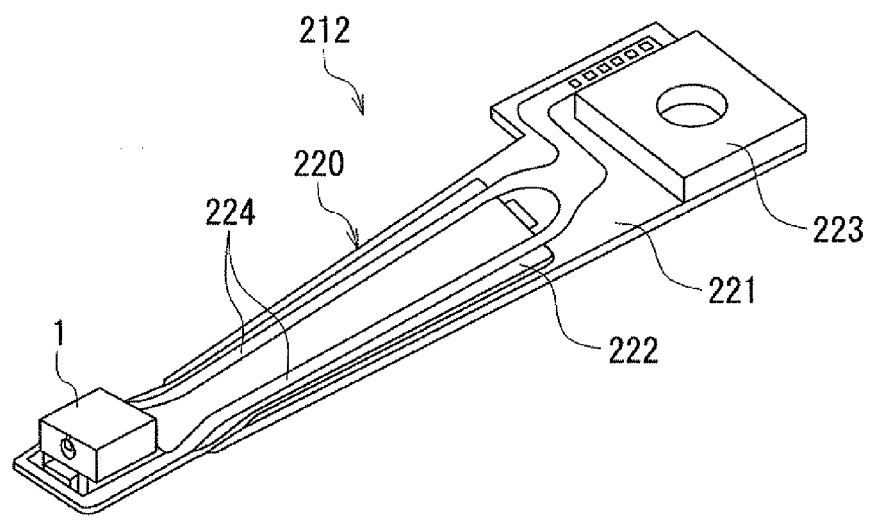
FIG. 7 is a perspective view showing a head gimbal assembly according to the embodiment of the invention.

FIG. 7 is a perspective view showing the head gimbal assembly 212 of FIG. 6. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexture 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 7. For example, the head gimbal assembly of the present invention may have an IC chip for driving the head that is mounted somewhere along the suspension 220.

Figure 8:
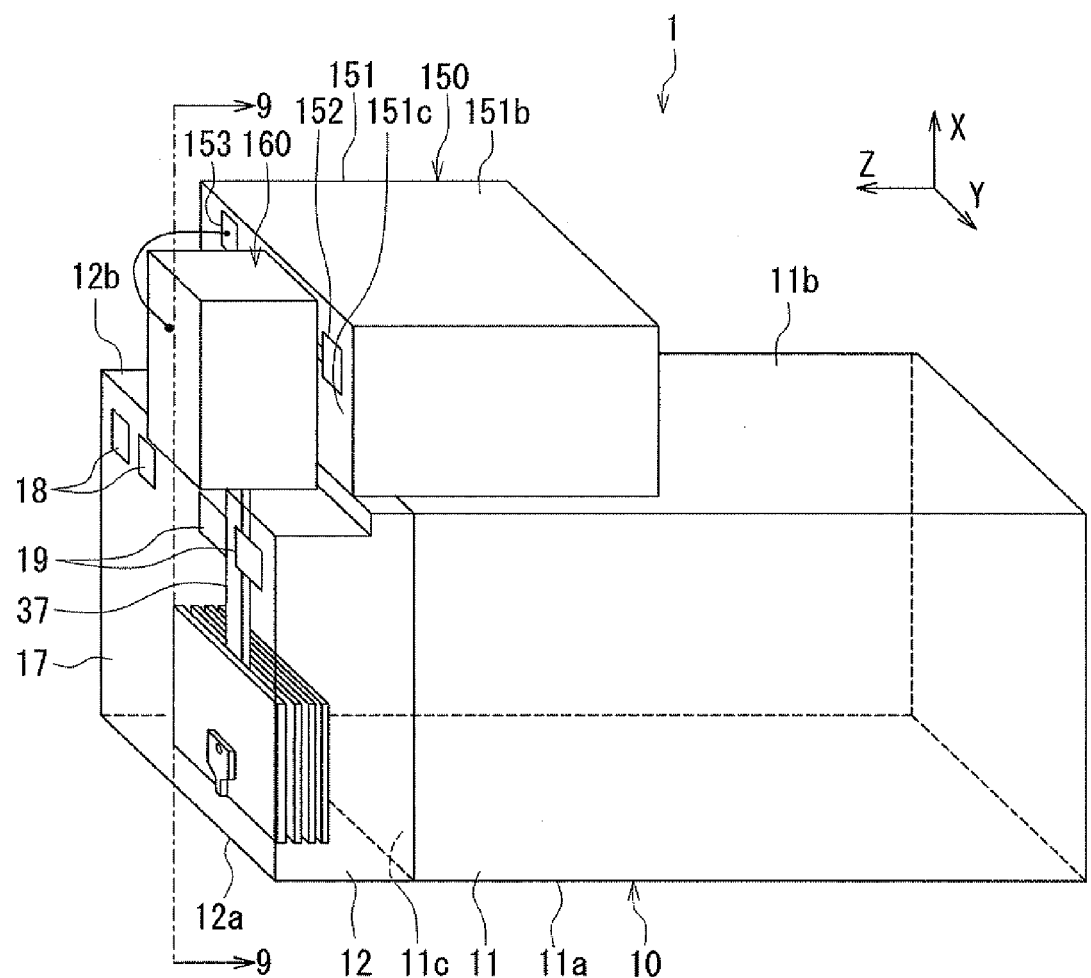
FIG. 8 is a perspective view showing the thermally-assisted magnetic recording head according to the embodiment of the invention.
Figure 9:
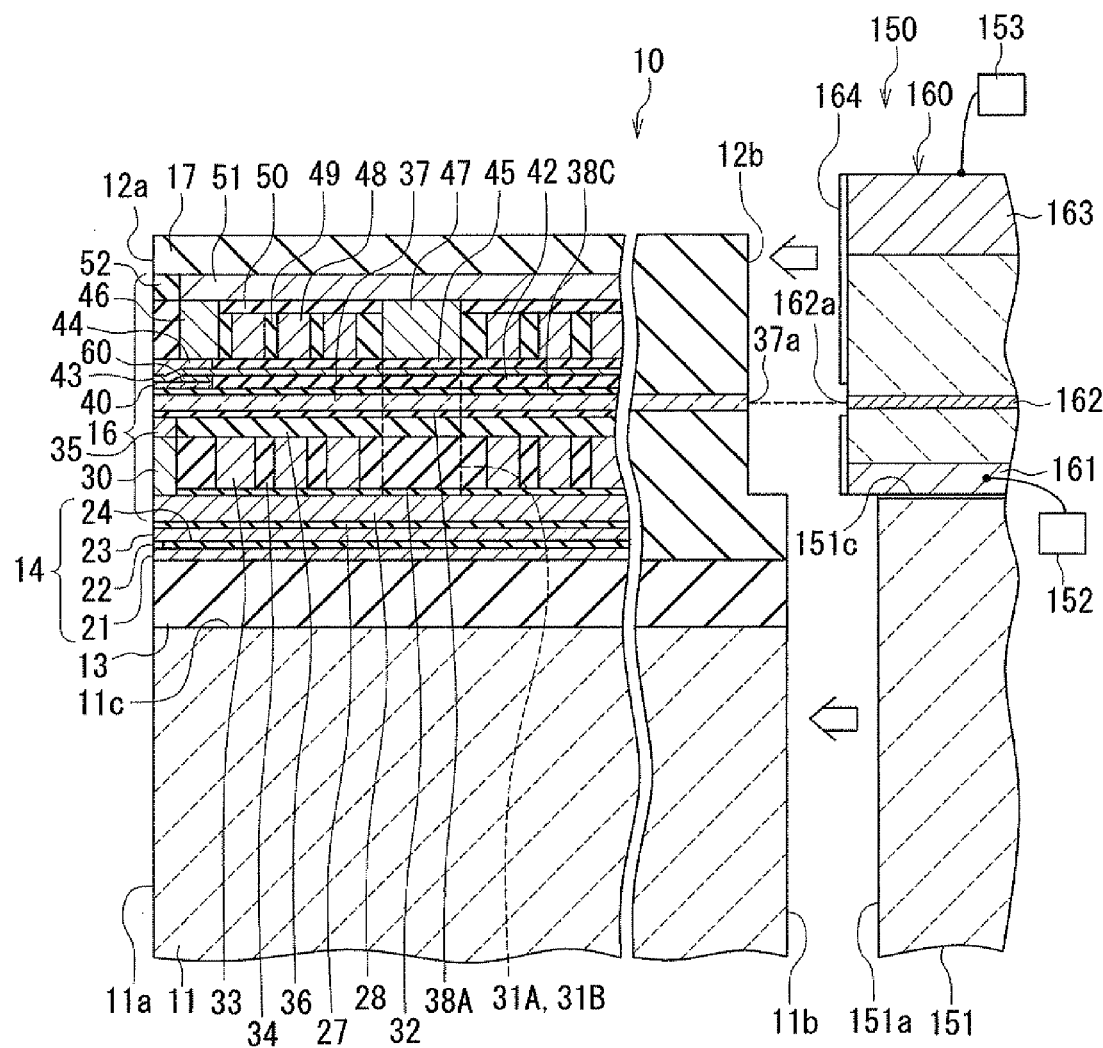
FIG. 9 shows a cross section taken along line 9-9 of FIG. 8.

The configuration of the thermally-assisted magnetic recording head 1 according to the embodiment will now be described with reference to FIG. 8 and FIG. 9. FIG. 8 is a perspective view showing the thermally-assisted magnetic recording head 1. FIG. 9 shows a cross section taken along line 9-9 of FIG. 8. The thermally-assisted magnetic recording head 1 includes a slider 10 and a light source unit 150. FIG. 9 shows a state where the slider 10 and the light source unit 150 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c is defined as a "top surface."

Moreover, X direction, Y direction, Z direction, -X direction, -Y direction, and -Z direction will be defined as follows. The X direction is a direction perpendicular to the medium facing surface 11a and from the medium facing surface 11a to the rear surface 1ib. The Y direction is a direction parallel to the medium facing surface 11a and the element-forming surface 11c and from the back side to the front side of FIG. 9. The Z direction is a direction that extends perpendicular to the element-forming surface 11c and away from the element-forming surface 11c. The -X direction, the -Y direction, and the -Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the -Z direction. The slider 10 has an air outflow end (a trailing end) at the end of the medium facing surface 12a in the Z direction. Track width direction TW is parallel to the Y direction.

The light source unit 150 includes a laser diode 160 serving as a light source for emitting laser light, and a support member 151 that is in the shape of a rectangular solid and supports the laser diode 160. The support member 151 is made of, for example, a ceramic material such as aluminum oxide-titanium carbide ($Al_2O_3$—TiC). The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c. The support member 151 may function as a heat sink for dissipating heat generated by the laser diode 160, as well as serving to support the laser diode 160.

As shown in FIG. 9, the head section 12 includes an insulating layer 13 disposed on the element-forming surface 11c, and also includes a read head section 14, a write head section 16, and a protective layer 17 that are stacked in this order on the insulating layer 13. The insulating layer 13 and the protective layer 17 are each made of an insulating material such as $Al_2O_3$ (hereinafter, also referred to as alumina).

The read head section 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 27 disposed on the top shield layer 23. The insulating layer 27 is made of an insulating material such as alumina.

The write head section 16 is for use in perpendicular magnetic recording. The write head section 16 includes a return shield layer 28 disposed on the insulating layer 27, and a not-shown insulating layer disposed on the insulating layer 27 and surrounding the return shield layer 28. The return shield layer 28 is made of a soft magnetic material. The return shield layer 28 has an end face located in the medium facing surface 12a. The top surfaces of the return shield layer 28 and the not-shown insulating layer are even with each other.

The write head section 16 further includes a coupling layer 30 and coupling portions 31A and 31B disposed on the return shield layer 28. The coupling layer 30 and the coupling portions 31A and 31B are each made of a soft magnetic material. The coupling layer 30 has an end face located in the medium facing surface 12a. The coupling portions 31A and 31B are located farther from the medium facing surface 12a than is the coupling layer 30. Each of the coupling portions 31A and 31B includes a first layer disposed on the return shield layer 28, and a second, a third, and a fourth layer stacked in this order on the first layer. The first layer of the coupling portion 31A and the first layer of the coupling portion 31B are arranged to align in the track width direction TW.

The write head section 16 further includes an insulating layer 32 disposed over the return shield layer 28 and the not-shown insulating layer to surround the coupling layer 30, and a coil 33 disposed on the insulating layer 32. The coil 33 is planar spiral-shaped and wound around the first layers of the coupling portions 31A and 31B. The coil 33 is made of a conductive material such as copper. The write head section 16 further includes an insulating layer 34 disposed around the coupling layer 30 and the coil 33 and in the space between every adjacent turns of the coil 33. The first layers of the coupling portions 31A and 31B are embedded in the insulating layers 32 and 34.

The write head section 16 further includes a leading shield layer 35 disposed on the coupling layer 30, and an insulating layer 36 disposed over the coil 33 and the insulating layer 34 and surrounding the leading shield layer 35. The leading shield layer 35 is made of a soft magnetic material. The leading shield layer 35 has an end face located in the medium facing surface 12a. The second layers of the coupling portions 31A and 31B are embedded in the insulating layer 36. The top surfaces of the second layers of the coupling portions 31A and 31B, the leading shield layer 35, and the insulating layer 36 are even with each other.

Figure 1:
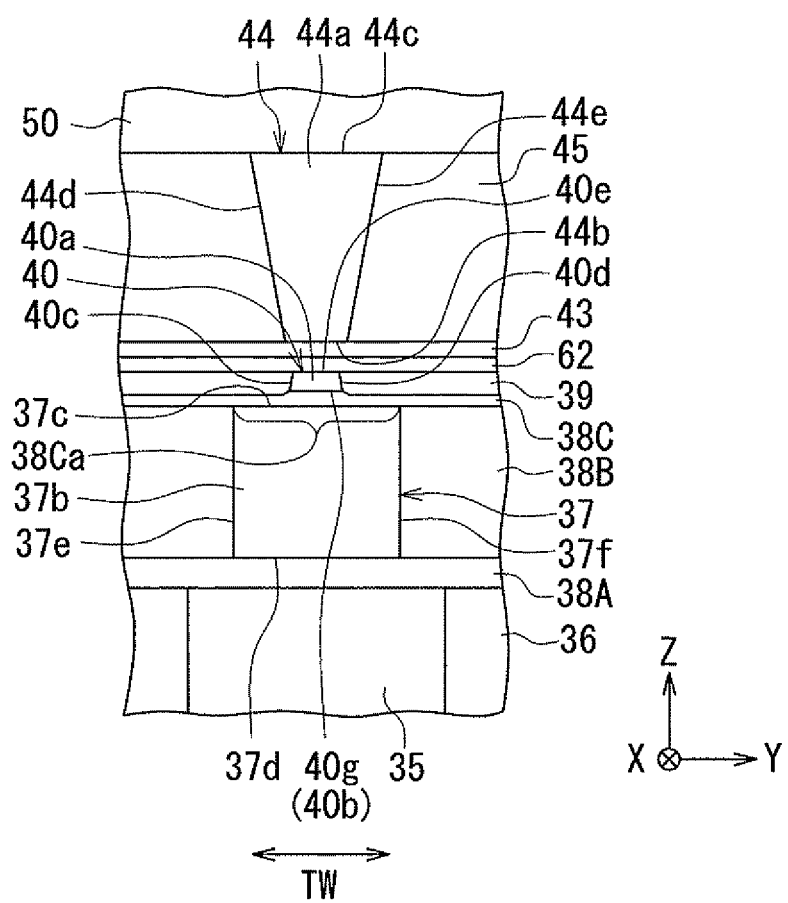
FIG. 1 is a front view showing the main part of a thermally-assisted magnetic recording head according to an embodiment of the invention.

The write head section 16 further includes a waveguide including a core 37 and a cladding. The cladding includes cladding layers 38A and 38B and a dielectric film 38C. The cladding layer 38A is disposed over the leading shield layer 35 and the insulating layer 36. The core 37 is disposed on the cladding layer 38A. The cladding layer 38B is disposed on the cladding layer 38A and surrounds the core 37. The cladding layer 38B is not shown in FIG. 9 but is shown in FIG. 1, which will be described later. The dielectric film 38C is disposed over the core 37 and the cladding layer 38B.

The core 37 extends in the direction perpendicular to the medium facing surface 12a (the X direction). The core 37 has an incidence end 37a, and a front end face opposite thereto. The core 37 allows laser light that is emitted from the laser diode 160 and incident on the incidence end 37a to propagate therethrough.

The core 37 is made of a dielectric material that transmits the laser light. The cladding layers 38A and 38B and the dielectric film 38C are each made of a dielectric material and have a refractive index lower than that of the core 37. For example, if the laser light has a wavelength of 600 nm and the core 37 is made of $Al_2O_3$ (refractive index n=1.63), the cladding layers 38A and 38B and the dielectric film 38C may be made of $SiO_2$ (refractive index n=1.46). If the core 37 is made of tantalum oxide such as $Ta_2O_5$ (n=2.16), the cladding layers 38A and 38B and the dielectric film 38C may be made of $SiO_2$ (n=1.46) or $Al_2O_3$ (n=1.63). The core 37 will be described in more detail later.

The third layers of the coupling portions 31A and 31B are embedded in the cladding layers 38A and 38B. The third layer of the coupling portion 31A and the third layer of the coupling portion 31B are located on opposite sides of the core 37 in the track width direction TW, and are each spaced from the core 37.

The write head section 16 further includes: a plasmon generator 40 disposed on the dielectric film 38C in the vicinity of the medium facing surface 12a; a heat sink 60 disposed on the plasmon generator 40; dielectric layers 39 disposed on opposite sides of the plasmon generator 40 in the track width direction TW; a dielectric layer 42 disposed around the plasmon generator 40, the heat sink 60 and the dielectric layers 39; and a nonmagnetic layer 43 disposed over the heat sink 60 and the dielectric layer 42. The dielectric layers 39 are not shown in FIG. 9 but are shown in FIG. 1, which will be described later. The plasmon generator 40 is made of a conductive material such as a metal. For example, the plasmon generator 40 may be made of one element selected from the group consisting of Au, Ag, Cu, and Al, or of an alloy composed of two or more of these elements. The heat sink 60 may be made of a metal the same as or different from that used for the plasmon generator 40. The dielectric layers 39 and 42 are made of $SiO_2$, for example. The nonmagnetic layer 43 is made of Ta, for example. The plasmon generator 40 and the heat sink 60 will be described in more detail later.

The write head section 16 further includes a magnetic pole 44 disposed on the nonmagnetic layer 43 in the vicinity of the medium facing surface 12a, and an insulating layer 45 disposed on the nonmagnetic layer 43 and surrounding the magnetic pole 44. The magnetic pole 44 is made of a soft magnetic material, or a magnetic metal material in particular. The fourth layers of the coupling portions 31A and 31B are embedded in the dielectric film 38C, the dielectric layer 42, the nonmagnetic layer 43, and the insulating layer 45. The top surfaces of the fourth layers of the coupling portions 31A and 31B, the magnetic pole 44, and the insulating layer 45 are even with each other. The magnetic pole 44 will be described in more detail later.

The write head section 16 further includes a coupling layer 46 disposed on the magnetic pole 44, a coupling layer 47 disposed on the fourth layers of the coupling portions 31A and 31B and the insulating layer 45, and a coil 48 disposed on the insulating layer 45. The coupling layers 46 and 47 are each made of a soft magnetic material. The coil 48 is planar spiral-shaped and wound around the coupling layer 47. The coil 48 is made of a conductive material such as copper.

The write head section 16 further includes an insulating layer 49 disposed around the coupling layer 47 and the coil 48 and in the space between every adjacent turns of the coil 48, and an insulating layer 50 disposed over the coil 48 and the insulating layer 49 and around the coupling layers 46 and 47. The top surfaces of the coupling layers 46 and 47 and the insulating layer 50 are even with each other.

The write head section 16 further includes a yoke layer 51 and an insulating layer 52. The yoke layer 51 is disposed over the coupling layers 46 and 47 and the insulating layer 50. The yoke layer 51 is in contact with the top surface of the coupling layer 46 at a position near the medium facing surface 12a, and in contact with the top surface of the coupling layer 47 at a position away from the medium facing surface 12a. The yoke layer 51 is made of a soft magnetic material. The insulating layer 52 is disposed on the insulating layer 50 and surrounds the yoke layer 51.

The leading shield layer 35, the coupling layer 30, the return shield layer 28, the coupling portions 31A and 31B, the coupling layer 47, the yoke layer 51, and the coupling layer 46 constitute a magnetic path forming section in the write head section 16. The magnetic path forming section is made of a magnetic material and connected to the magnetic pole 44 so as to form a magnetic path in conjunction with the magnetic pole 44 for passing magnetic fluxes corresponding to the magnetic fields produced by the coils 33 and 48. The magnetic path forming section has an end face located in the medium facing surface 12a. In the embodiment, the end face of the magnetic path forming section is composed of the end face of the return shield layer 28, the end face of the coupling layer 30, and the end face of the leading shield layer 35. The coils 33 and 48 produce magnetic fields corresponding to data to be written on the magnetic disk 201. The coils 33 and 48 are connected in series or in parallel so that the magnetic flux corresponding to the magnetic field produced by the coil 33 and the magnetic flux corresponding to the magnetic field produced by the coil 48 flow in the same direction through the magnetic path forming section and the magnetic pole 44. The magnetic pole 44 has an end face located in the medium facing surface 12a. The magnetic pole 44 allows the magnetic flux corresponding to the magnetic field produced by the coil 33 and the magnetic flux corresponding to the magnetic field produced by the coil 48 to pass, and produces a write magnetic field for writing data on the magnetic disk 201.

As shown in FIG. 9, the protective layer 17 is disposed to cover the write head section 16. As shown in FIG. 8, the head section 12 further includes a pair of terminals 18 that are disposed on the top surface of the protective layer 17 and electrically connected to the MR element 22, and a pair of terminals 19 that are disposed on the top surface of the protective layer 17 and electrically connected to the coils 33 and 48. These terminals 18 and 19 are electrically connected to the plurality of pad-shaped terminals of the wiring member 224 shown in FIG. 7.

The laser diode 160 may be a laser diode of InP type, GaAs type, GaN type or the like that is commonly used for such applications as communications, optical disc storage and material analysis. The laser diode 160 may emit laser light of any wavelength within the range of, for example, 375 nm to 1.7 μm. Specifically, the laser diode 160 may be an InGaAsP/InP quarternary mixed crystal laser diode having an emittable wavelength range of 1.2 to 1.67 μm, for example.

As shown in FIG. 9, the laser diode 160 has a multilayer structure including a lower electrode 161, an active layer 162, and an upper electrode 163. A reflecting layer 164 made of, for example, $SiO_2$ or $Al_2O_3$, is formed on two cleavage planes of the multilayer structure so as to excite oscillation by total reflection of light. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 7. When a predetermined voltage is applied to the laser diode 160 through the terminals 152 and 153, laser light is emitted from the emission center 162a of the laser diode 160. The laser light emitted from the laser diode 160 is preferably TM-mode polarized light whose electric field oscillates in a direction perpendicular to the plane of the active layer 162.

The laser diode 160 can be driven by a power supply inside the magnetic disk drive. The magnetic disk drive usually includes a power supply that generates a voltage of 5 V or so, for example. This supply voltage is sufficient to drive the laser diode 160. The laser diode 160 has a power consumption of, for example, several tens of milliwatts or so, which can be adequately covered by the power supply in the magnetic disk drive.

The light source unit 150 is secured to the slider 10 by bonding the bond surface 151a of the support member 151 to the rear surface 11b of the slider substrate 11, as shown in FIG. 9. The laser diode 160 and the core 37 are positioned with respect to each other so that the laser light emitted from the laser diode 160 will be incident on the incidence end 37a of the core 37.

Figure 2:
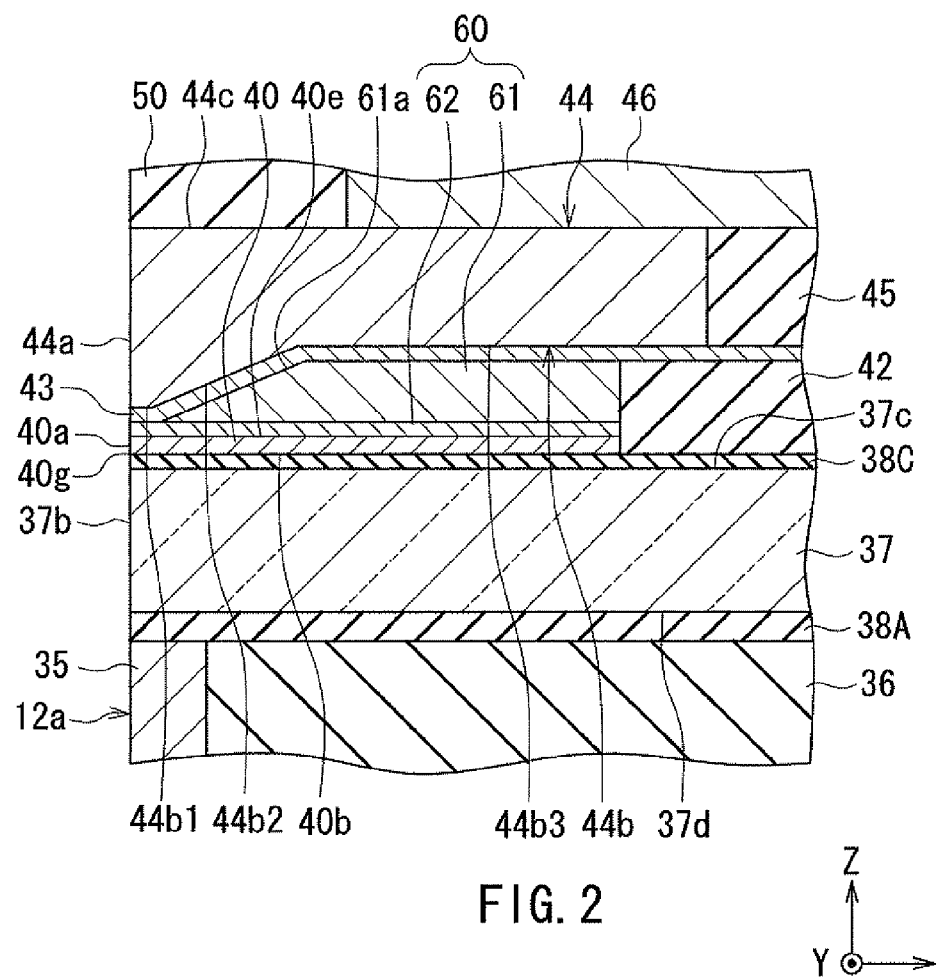
FIG. 2 is a cross-sectional view showing the main part of the thermally-assisted magnetic recording head according to the embodiment of the invention.
Figure 3:
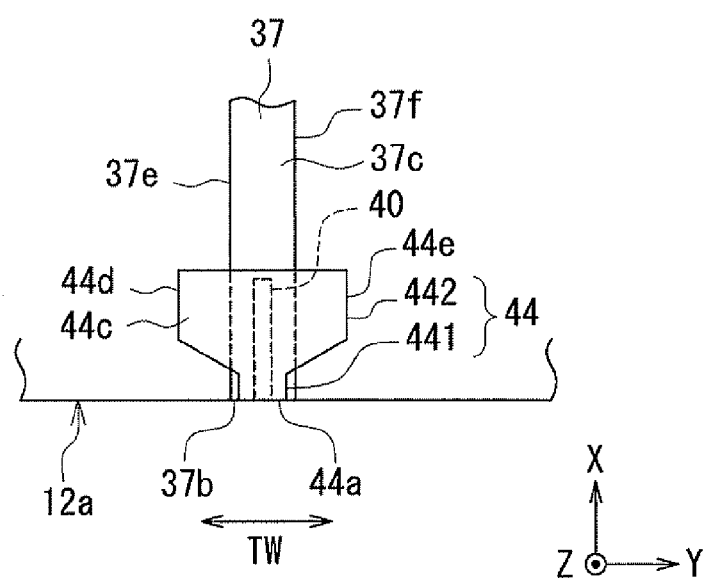
FIG. 3 is a plan view showing the main part of the thermally-assisted magnetic recording head according to the embodiment of the invention.
Figure 4:
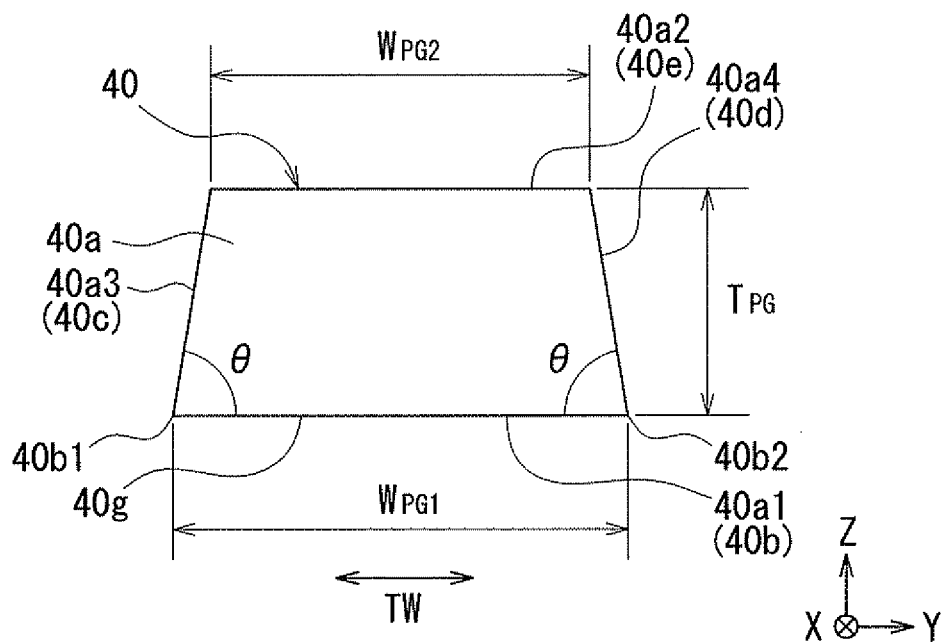
FIG. 4 is an explanatory diagram showing a first example of the shape of a plasmon generator of the embodiment of the invention.
Figure 5:
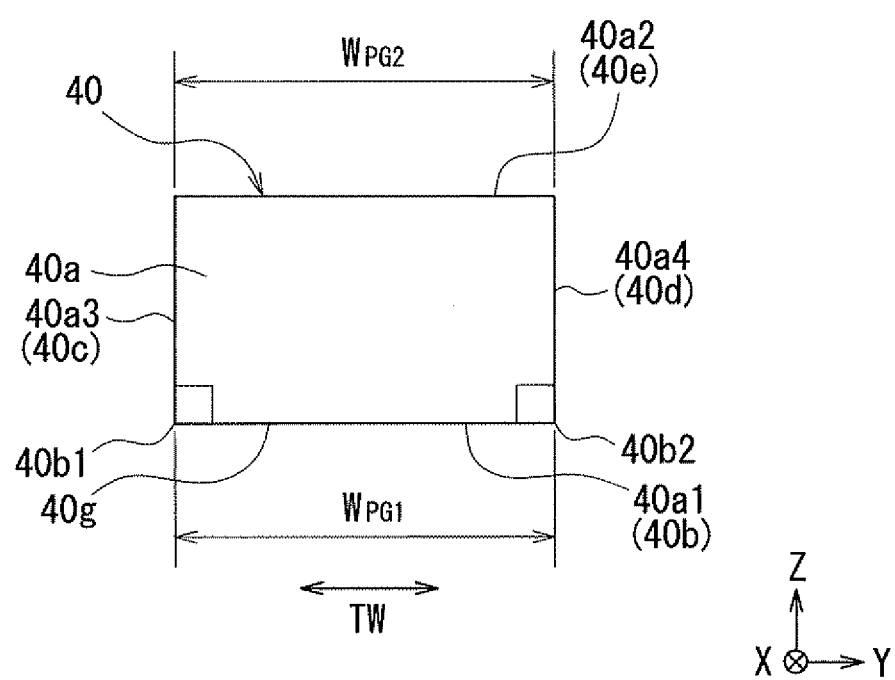
FIG. 5 is an explanatory diagram showing a second example of the shape of the plasmon generator of the embodiment of the invention.

The core 37, the plasmon generator 40, the heat sink 60, and the magnetic pole 44 will now be described in detail with reference to FIG. 1 to FIG. 5. FIG. 1 is a front view showing the main part of the thermally-assisted magnetic recording head 1. Note that FIG. 1 shows part of the medium facing surface 12a. FIG. 2 is a cross-sectional view showing the main part of the thermally-assisted magnetic recording head 1. FIG. 2 shows a cross section perpendicular to the element-forming surface 11c and the medium facing surface 12a. FIG. 3 is a plan view showing the main part of the thermally-assisted magnetic recording head 1. FIG. 4 is an explanatory diagram showing a first example of the shape of the plasmon generator 40. FIG. 5 is an explanatory diagram showing a second example of the shape of the plasmon generator 40.

As shown in FIG. 1 and FIG. 2, the magnetic pole 44 is located forward of the core 37 in the direction of travel of the magnetic disk 201 (the Z direction), that is, located on the trailing end side relative to the core 37. The plasmon generator 40 is disposed between the core 37 and the magnetic pole 44.

As shown in FIG. 1 to FIG. 3, the core 37 has a front end face 37b located closer to the medium facing surface 12a, an evanescent light generating surface 37c which is a top surface, a bottom surface 37d, and two side surfaces 37e and 37f, in addition to the incidence end 37a shown in FIG. 9. FIG. 1 to FIG. 3 show an example where the front end face 37b is located in the medium facing surface 12a; however, the front end face 37b may be located away from the medium facing surface 12a. The evanescent light generating surface 37c is perpendicular to the Z direction, and faces toward the plasmon generator 40. The evanescent light generating surface 37c generates evanescent light based on the light propagating through the core 37.

As shown in FIGS. 1, 2, 4 and 5, the plasmon generator 40 has a front end face 40a located in the medium facing surface 12a, a flat surface 40b facing toward the evanescent light generating surface 37c, a first side surface 40c, a second side surface 40d, and a top surface 40e. The first side surface 40c and the second side surface 40d are at a distance from each other and are located farther from the evanescent light generating surface 37c than is the flat surface 40b. As shown in FIG. 1, the dielectric film 38C includes a gap part 38Ca located between the evanescent light generating surface 37c and the flat surface 40b. Since the dielectric film 38C is part of the cladding, the cladding can be said to include the gap part 38Ca.

The flat surface 40b is shaped like a band, parallel to the evanescent light generating surface 37c and elongated in a first direction perpendicular to the medium facing surface 12a (the X direction). As shown in FIG. 4 and FIG. 5, the flat surface 40b has a first edge 40b1 and a second edge 40b2 that are opposite to each other in a second direction parallel to the evanescent light generating surface 37c and the medium facing surface 12a (the Y direction). The first side surface 40c is connected to the first edge 40b1. The second side surface 40d is connected to the second edge 40b2.

The distance between the first and second side surfaces 40c and 40d in the second direction (the Y direction) may change with distance from the evanescent light generating surface 37c, or may be constant regardless of the distance from the evanescent light generating surface 37c. As a first example of the shape of the plasmon generator 40, FIG. 4 illustrates the shape of the plasmon generator 40 where the distance between the first and second side surfaces 40c and 40d in the second direction decreases with increasing distance from the evanescent light generating surface 37c. As a second example of the shape of the plasmon generator 40, FIG. 5 illustrates the shape of the plasmon generator 40 where the distance between the first and second side surfaces 40c and 40d in the second direction is constant regardless of the distance from the evanescent light generating surface 37c, that is, the first and second side surfaces 40c and 40d are parallel to each other. FIG. 4 and FIG. 5 both show the front end face 40a of the plasmon generator 40.

The front end face 40a includes a near-field light generating part 40g that generates near-field light. More specifically, the near-field light generating part 40g is an end of the front end face 40a intersecting the flat surface 40b, or refers to this end and a portion therearound. In the embodiment, the front end face 40a is quadrilateral in shape and has a first side 40a1 located closest to the evanescent light generating surface 37c, a second side 40a2 located farthest from the evanescent light generating surface 37c, and a third side 40a3 and a fourth side 40a4 connecting the first and second sides 40a1 and 40a2 to each other.

As shown in FIG. 4 and FIG. 5, the length of the first side 40a1 will be represented by the symbol $W_{PG1}$, and the length of the second side 40a2 will be represented by the symbol $W_{PG2}$. The length $W_{PG1}$ falls within the range of 15 to 50 nm, for example. In the aforementioned first example, as shown in FIG. 4, the length $W_{PG2}$ is equal to or smaller than the length $W_{PG1}$, and falls within the range of 5 to 50 nm, for example. In the aforementioned second example, as shown in FIG. 5, the lengths $W_{PG1}$ and $W_{PG2}$ are equal. The length of the front end face 40a in a third direction perpendicular to the evanescent light generating surface 37c (the Z direction) will be represented by the symbol $T_{PG}$. The length $T_{PG}$ falls within the range of 20 to 40 nm, for example.

As shown in FIG. 4, the angle formed between the first side 40a1 and the third side 40a3 and the angle formed between the first side 40a1 and the fourth side 40a4 will be represented by the symbol θ. The angle θ falls within the range of 45° to 90°, for example. In the second example shown in FIG. 5, the angle θ is 90°.

The plasmon generator 40 has a dimension in the X direction of 0.8 to 1.6 µm, for example. The distance between the flat surface 40b and the evanescent light generating surface 37c falls within the range of 10 to 80 nm, for example.

A portion of the core 37 in the vicinity of the plasmon generator 40 has a dimension in the Y direction (width) of 0.3 to 1 µm, for example. The remaining portion of the core 37 may have a width greater than that of the portion of the core 37 in the vicinity of the plasmon generator 40. The portion of the core 37 in the vicinity of the plasmon generator 40 has a dimension in the Z direction (thickness) of 0.3 to 0.6 µm, for example.

As shown in FIG. 1 and FIG. 2, the magnetic pole 44 has an end face 44a located in the medium facing surface 12a, a bottom surface 44b, a top surface 44c, and two side surfaces 44d and 44e. As shown in FIG. 3, the magnetic pole 44 includes a track width defining portion 441 and a wide portion 442. The track width defining portion 441 has a first end located in the medium facing surface 12a and a second end opposite to the first end. The wide portion 442 is connected to the second end of the track width defining portion 441. The width of the top surface 44c in the track width direction TW is greater in the wide portion 442 than in the track width defining portion 441.

In the track width defining portion 441, the width of the top surface 44c in the track width direction TW is generally constant regardless of the distance from the medium facing surface 12a. In the wide portion 442, the width of the top surface 44c in the track width direction TW is, for example, equal to that in the track width defining portion 441 when seen at the boundary between the track width defining portion 441 and the wide portion 442, and gradually increases with increasing distance from the medium facing surface 12a, then becoming constant. Here, the length of the track width defining portion 441 in the direction perpendicular to the medium facing surface 12a will be referred to as the neck height. The neck height falls within the range of 0 to 0.3 µm, for example. A zero neck height means that no track width defining portion 441 exists and an end face of the wide portion 442 is thus located in the medium facing surface 12a.

As shown in FIG. 2, the bottom surface 44b of the magnetic pole 44 includes a first flat portion 44b1, a sloped portion 44b2, and a second flat portion 44b3 arranged in this order, the first flat portion 44b1 being closest to the medium facing surface 12a. The distance between the sloped portion 44b2 and the flat surface 40b of the plasmon generator 40 in the third direction perpendicular to the evanescent light generating surface 37c (the Z direction) decreases with increasing proximity to the medium facing surface 12a. The first and second flat portions 44b1 and 44b3 extend in a direction substantially perpendicular to the medium facing surface 12a.

In the track width defining portion 441, the distance between the two side surfaces 44d and 44e in the Y direction may increase with increasing distance from the bottom surface 44b or may be constant regardless of the distance from the bottom surface 44b. FIG. 1 shows an example where the distance between the two side surfaces 44d and 44e of the magnetic pole 44 in the Y direction increases with increasing distance from the bottom surface 44b.

The heat sink 60 is disposed between the plasmon generator 40 and the magnetic pole 44. The heat sink 60 includes a first layer 61, and a second layer 62 that is in contact with the first layer 61 and located between the first layer 61 and the plasmon generator 40. The second layer 62 is shaped like a flat plate. The second layer 62 is in contact with the plasmon generator 40. Note that the second layer 62 is not an essential component of the heat sink 60 and can be dispensed with. Where there is not the second layer 62, the first layer 61 may be in contact with the plasmon generator 40.

The first layer 61 has a sloped surface 61a facing toward the magnetic pole 44. The sloped surface 61a is located at a distance from the medium facing surface 12a and is opposed to the sloped portion 44b2 of the bottom surface 44b of the magnetic pole 44 with the nonmagnetic layer 43 interposed therebetween. The distance between the sloped surface 61a and the flat surface 40b of the plasmon generator 40 in the third direction perpendicular to the evanescent light generating surface 37c (the Z direction) decreases with increasing proximity to the medium facing surface 12a.

Reference is now made to FIG. 9 to describe the principle of generation of near-field light in the embodiment and the principle of thermally-assisted magnetic recording using the near-field light. Laser light emitted from the laser diode 160 propagates through the core 37 of the waveguide to reach the vicinity of the plasmon generator 40. Here, the laser light is totally reflected at the evanescent light generating surface 37c. This causes evanescent light to occur from the evanescent light generating surface 37c to permeate into the gap part 38Ca. Then, surface plasmons are excited on at least the flat surface 40b of the plasmon generator 40 through coupling with the evanescent light. The surface plasmons propagate along the flat surface 40b to the near-field light generating part 40g. Consequently, the surface plasmons concentrate at the near-field light generating part 40g, and the near-field light generating part 40g generates near-field light based on the surface plasmons.

The near-field light is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 44 for data writing.

Figure 10:
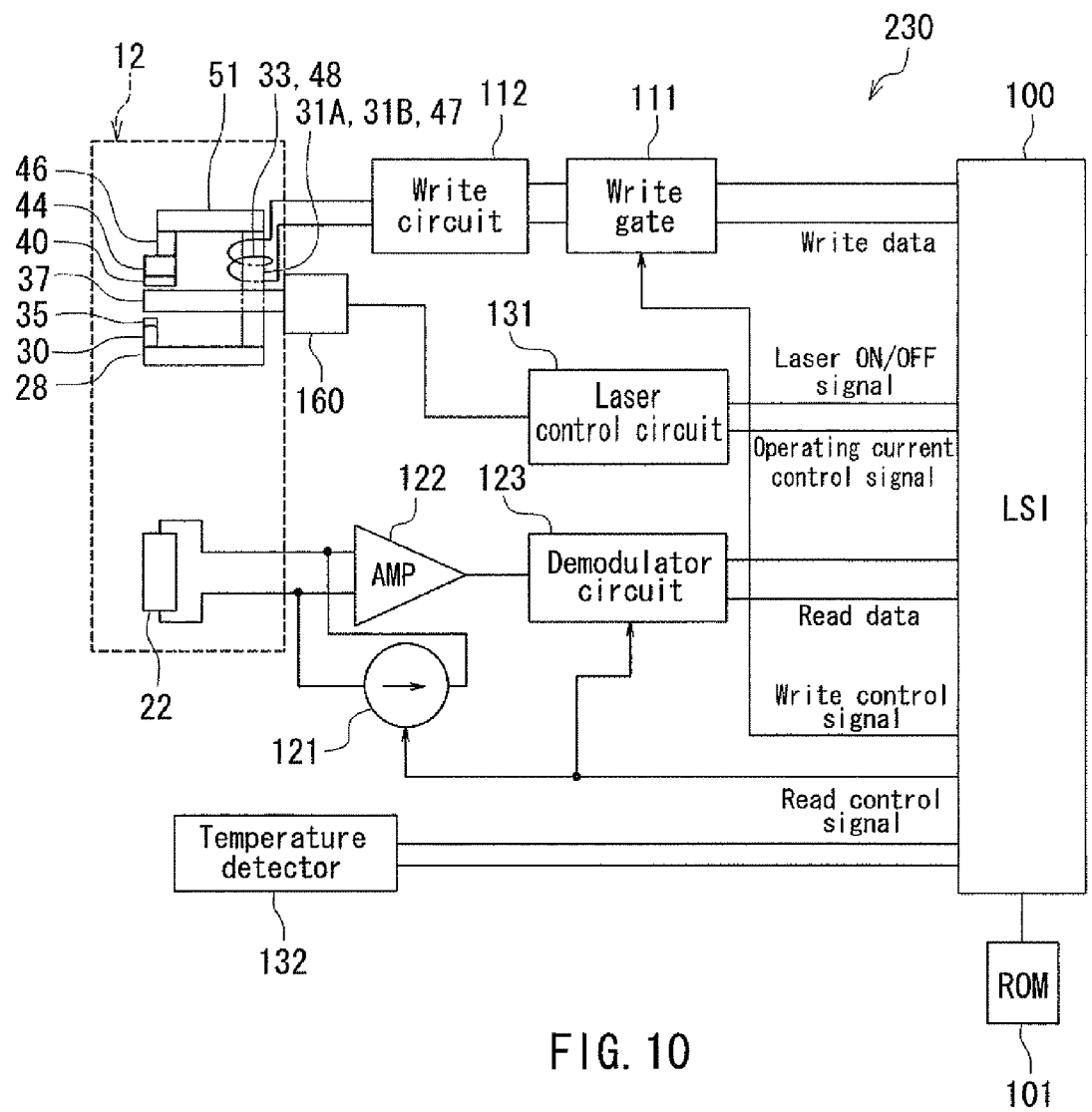
FIG. 10 is a block diagram showing the circuit configuration of the magnetic recording device according to the embodiment of the invention.

Reference is now made to FIG. 10 to describe the circuit configuration of the control circuit 230 shown in FIG. 6 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coils 33 and 48.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 160 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit. 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 160.

In a write operation, the control LSI 100 supplies write data to the write gate 111. The write gate 111 supplies the write data to the write circuit 112 only when the write control signal indicates a write operation. According to the write data, the write circuit 112 passes a write current through the coils 33 and 48. Consequently, the magnetic pole 44 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 160 on the basis of the laser ON/OFF signal, and also controls the value of the operating current to be supplied to the laser diode 160 on the basis of the operating current control signal. When the laser ON/OFF signal indicates an ON operation, the laser control circuit 131 exercises control so that an operating current at or above an oscillation threshold is supplied to the laser diode 160. Consequently, the laser diode 160 emits laser light, and the laser light propagates through the core 37. Then, according to the principle of generation of near-field light described previously, near-field light is generated from the near-field light generating part 40g of the plasmon generator 40. The near-field light heats a part of the magnetic recording layer of the magnetic disk 201, thereby lowering the coercivity of that part. When writing, the part of the magnetic recording layer with the lowered coercivity is subjected to the write magnetic field produced by the magnetic pole 44 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 160. Using the operating current control signal, the control LSI 100 controls the laser control circuit 131 so that the operating current of that value is supplied to the laser diode 160. The control table contains, for example, data that indicates the oscillation threshold and the temperature dependence of the light output versus operating current characteristic of the laser diode 160. The control table may further contain data that indicates the relationship between the operating current value and a temperature increase of the magnetic recording layer heated by the near-field light, and data that indicates the temperature dependence of the coercivity of the magnetic recording layer.

As shown in FIG. 10, the control circuit 230 has the signal system for controlling the laser diode 160, i.e., the signal system consisting of the laser ON/OFF signal and the operating current control signal, independent of the control signal system intended for read/write operations. This configuration makes it possible to implement various modes of energization of the laser diode 160, not only to energize the laser diode 160 simply in association with a write operation. It should be noted that the control circuit 230 may have any configuration other than the configuration shown in FIG. 10.

Now, a description will be given of a method of manufacturing the thermally-assisted magnetic recording head 1 according to the embodiment. The method of manufacturing the thermally-assisted magnetic recording head 1 includes the steps of manufacturing the slider 10; and securing the light source unit 150 onto the slider 10. The step of manufacturing the slider 10 includes the steps of: forming components of a plurality of sliders 10 except the slider substrates 11 on a substrate that includes portions to become the slider substrates 11 of the plurality of sliders 10, thereby fabricating a substructure including a plurality of pre-slider portions aligned in rows, the plurality of pre-slider portions being intended to become individual sliders 10 later; and forming a plurality of sliders 10 by cutting the substructure to separate the plurality of pre-slider portions from each other. In the step of forming a plurality of sliders 10, the cut surfaces are polished to form the medium facing surfaces 11a and 12a.

The step of fabricating the substructure will now be described with reference to FIG. 11A to FIG. 28C. The following descriptions will be focused on a single pre-slider portion. Since the step of fabricating the substructure is a step in the method of manufacturing the thermally-assisted magnetic recording head 1 according to the embodiment, the following descriptions can also be understood as an explanation of the method of manufacturing the thermally-assisted magnetic recording head 1 according to the embodiment.

FIG. 11A to FIG. 28A are plan views each showing part of a stack of layers formed in the process of fabricating the substructure. FIG. 11B to FIG. 28B and FIG. 11C to FIG. 28C are cross-sectional views each showing part of the stack. In FIG. 11A to FIG. 28A and FIG. 11C to FIG. 28C, the symbol "ABS" indicates the position where the medium facing surface 12a is to be formed. FIG. 11B to FIG. 28B each show a cross section of the stack taken at the position ABS. FIG. 11C to FIG. 28C each show a cross section perpendicular to the element-forming surface 11c and the medium facing surface 12a. In FIG. 11A to FIG. 28A, lines nC-nC (n is any integer between 11 and 28 inclusive) indicate the positions of the cross sections shown in FIG. 11C to FIG. 28C.

Figure 11A:
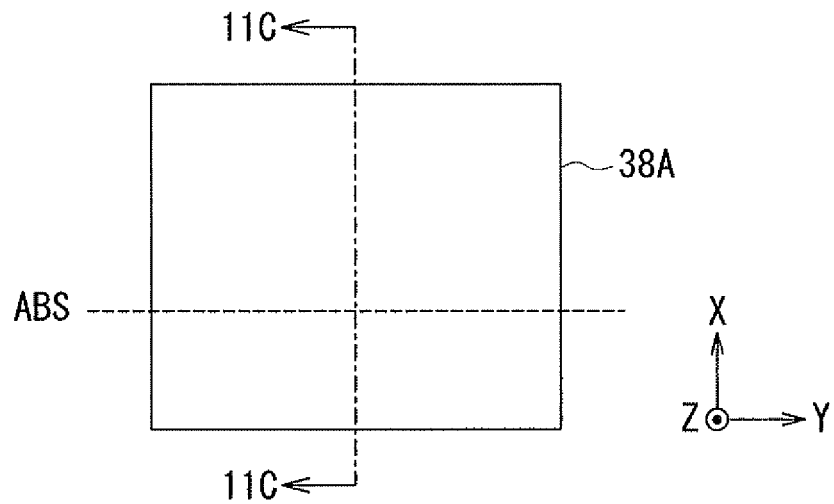
FIG. 11A to FIG. 11C are explanatory diagrams showing a step of a method of manufacturing the thermally-assisted magnetic recording head according to the embodiment of the invention.
Figure 11B:
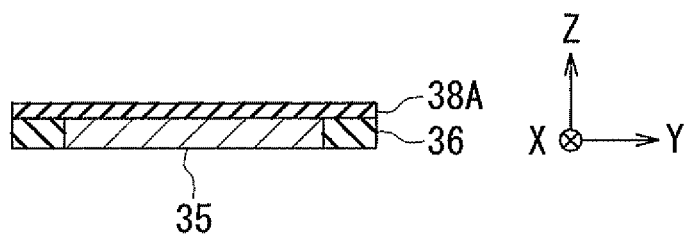
Figure 11C:
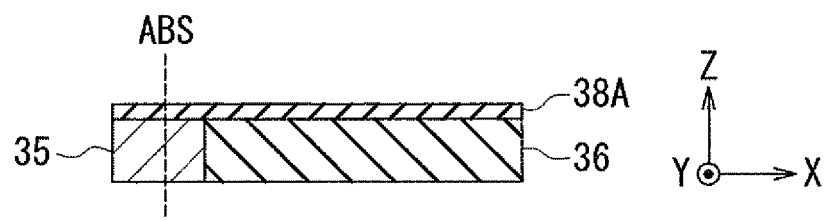

FIG. 11A to FIG. 11C show a stack in which the layers from the insulating layer 13 to the cladding layer 38A have been sequentially formed on the element-forming surface 11c (see FIG. 9).

Figure 12A:
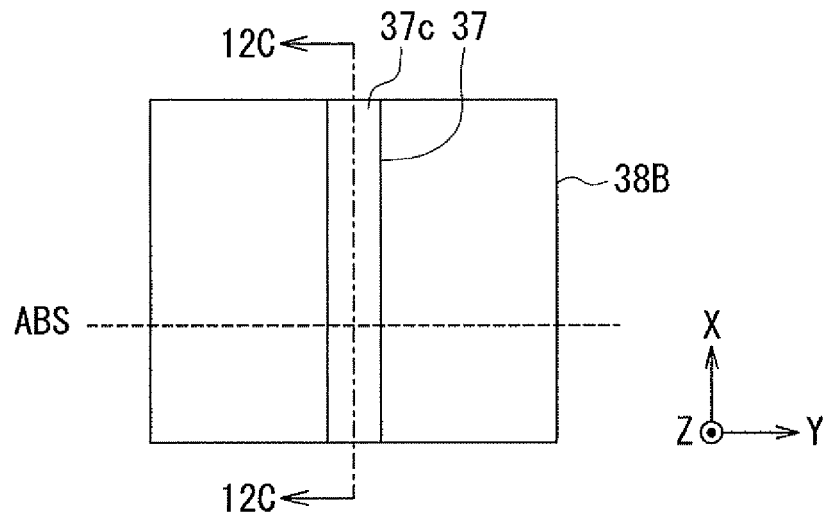
FIG. 12A to FIG. 12C are explanatory diagrams showing a step that follows the step shown in FIG. 11A to FIG. 11C.
Figure 12B:
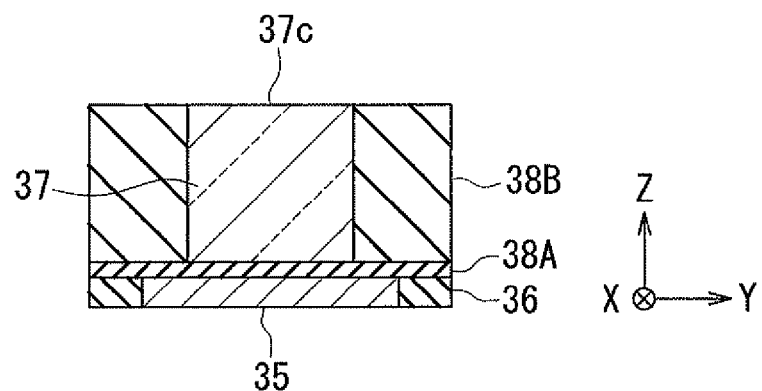
Figure 12C:
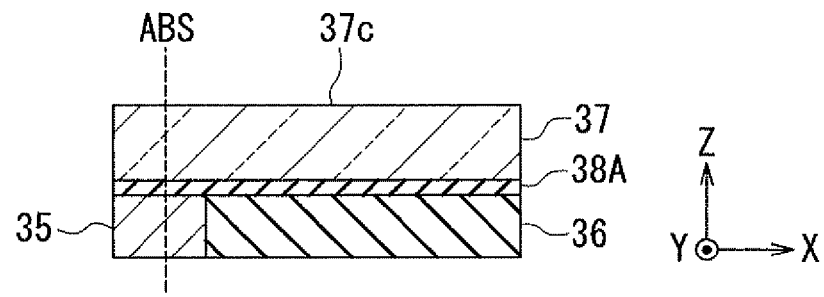

FIG. 12A to FIG. 12C show the next step. In this step, first, the core 37 is formed on the cladding layer 38A. The cladding layer 38A is then selectively etched to form therein openings for exposing the top surfaces of the second layers of the coupling portions 31A and 31B (see FIG. 9). Then, the third layers of the coupling portions 31A and 31B are formed on the second layers of the coupling portions 31A and 31B. Next, the cladding layer 38B is formed over the entire top surface of the stack. The cladding layer 38B is then polished by, for example, chemical mechanical polishing (hereinafter referred to as CMP), until the core 37 and the third layers of the coupling portions 31A and 31B are exposed. The evanescent light generating surface 37c and the top surface of the cladding layer 38B located therearound are thereby made even with each other.

Figure 13A:
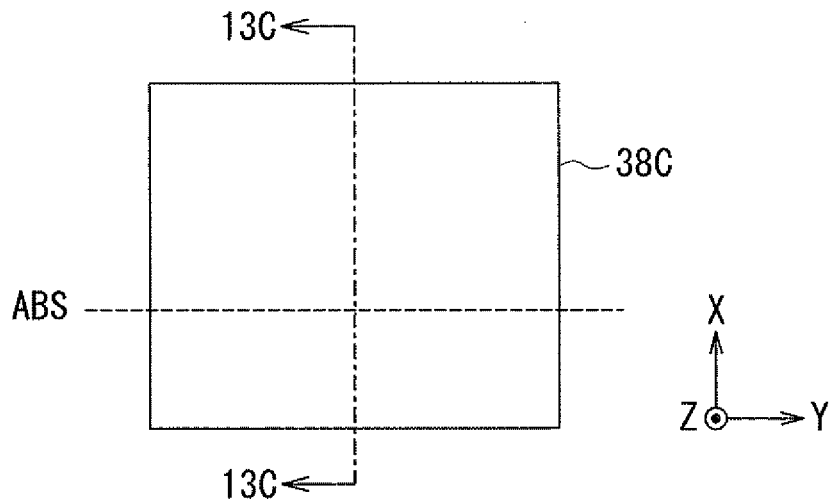
FIG. 13A to FIG. 13C are explanatory diagrams showing a step that follows the step shown in FIG. 12A to FIG. 12C.
Figure 13B:
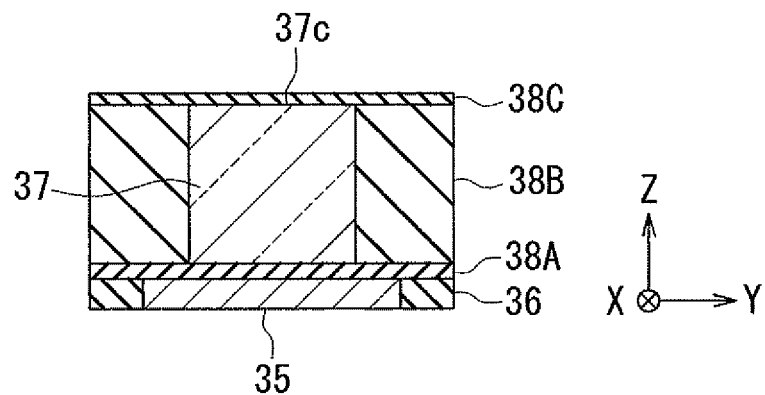
Figure 13C:
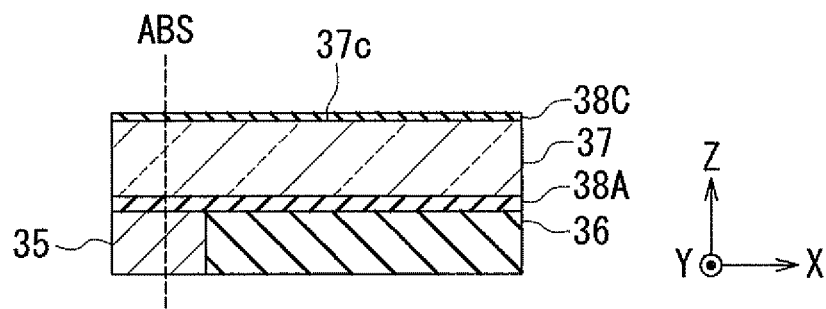

FIG. 13A to FIG. 13C show the next step. In this step, the dielectric film 38C is formed over the evanescent light generating surface 37c and the top surface of the cladding layer 38B by physical vapor deposition such as sputtering. The thickness of the dielectric film 38C defines the distance between the evanescent light generating surface 37c and the flat surface 40b of the plasmon generator 40 to be formed later.

Figure 14A:
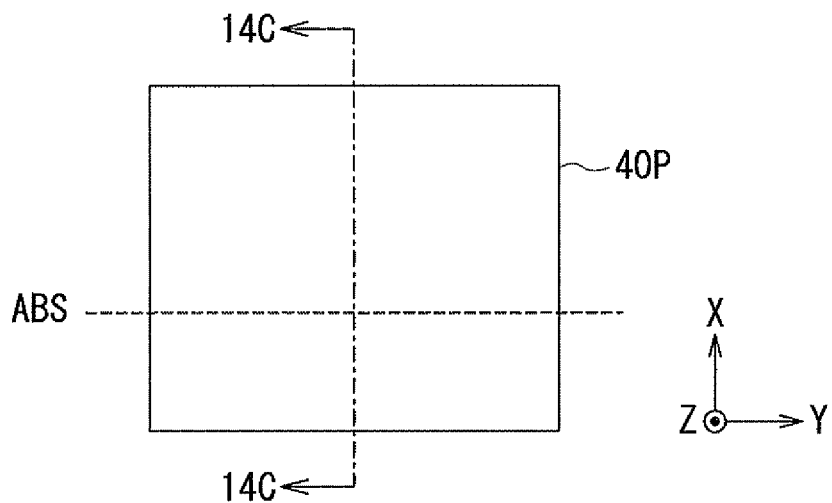
FIG. 14A to FIG. 14C are explanatory diagrams showing a step that follows the step shown in FIG. 13A to FIG. 13C.
Figure 14B:
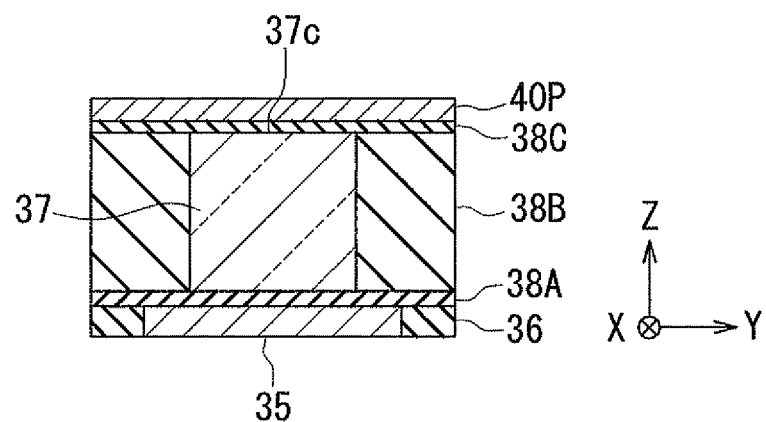
Figure 14C:
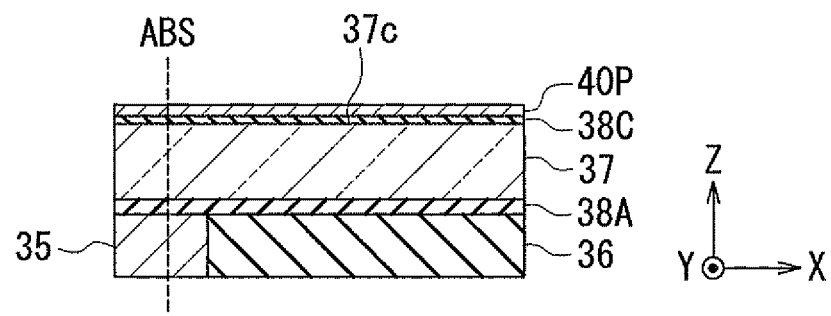

FIG. 14A to FIG. 14C show the next step. In this step, a metal film 40P is formed on the dielectric film 38C by sputtering, for example. The metal film 40P is to become the plasmon generator 40 later.

Figure 15A:
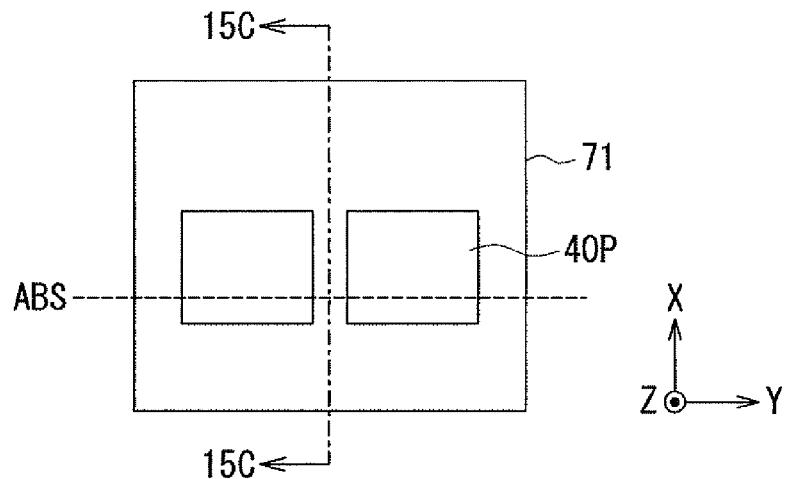
FIG. 15A to FIG. 15C are explanatory diagrams showing a step that follows the step shown in FIG. 14A to FIG. 14C.
Figure 15B:
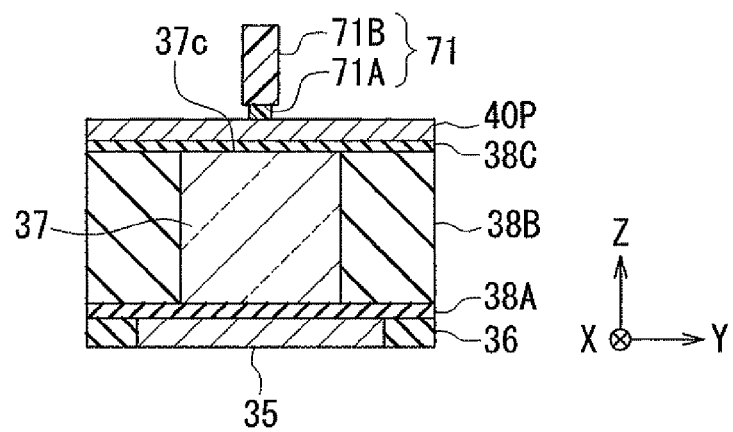
Figure 15C:
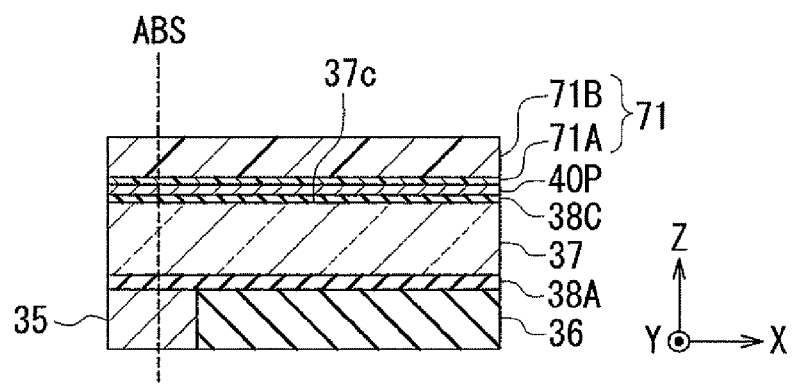

FIG. 15A to FIG. 15C show the next step. In this step, a mask 71 to be used for patterning the metal film 40P is formed on the metal film 40P. The mask has two openings on opposite sides of the area where the plasmon generator 40 is to be formed later in the track width direction TW. The mask 71 preferably has an undercut shape as shown in FIG. 15B for the sake of easy removal later. For example, the undercut mask 71 may consist of a lower layer 71A and an upper layer 71B as shown in FIG. 15B and FIG. 15C. The upper layer 71B is formed of a photoresist that is patterned by photolithography. The lower layer 71A is formed of, for example, a material that dissolves in a developing solution to be used when patterning the upper layer 71B.

Figure 16A:
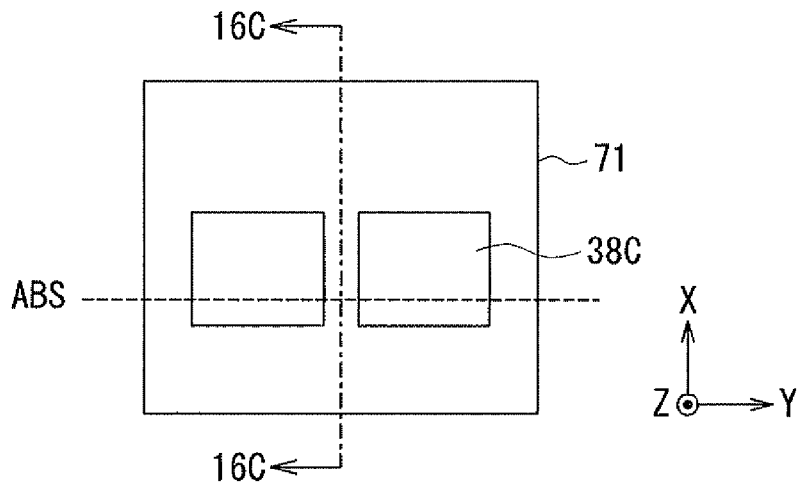
FIG. 16A to FIG. 16C are explanatory diagrams showing a step that follows the step shown in FIG. 15A to FIG. 15C.
Figure 16B:
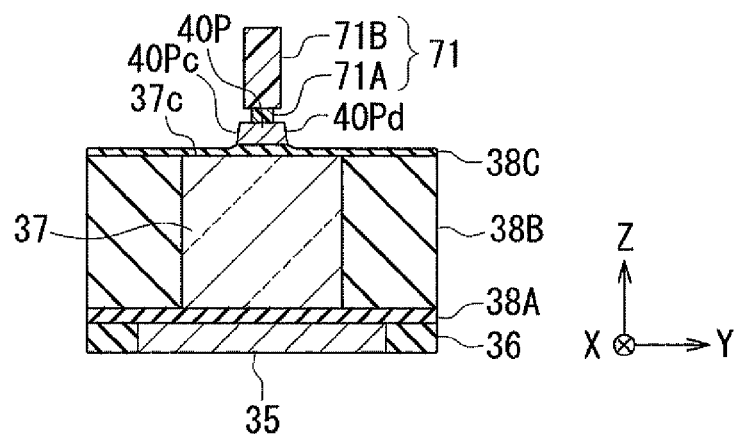
Figure 16C:
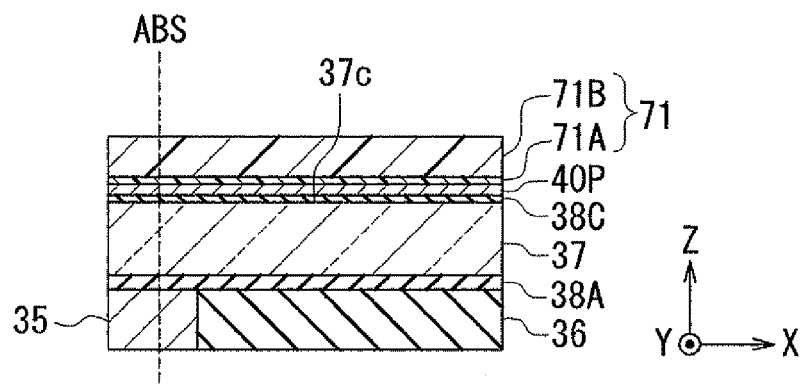

FIG. 16A to FIG. 16C show the next step. In this step, portions of the metal film 40P exposed from the two openings of the mask 71 are etched by, for example, ion milling using the mask 71 as an etching mask. This provides the metal film 40P with a first side surface 40Pc and a second side surface 40Pd that are to later become the first side surface 40c and the second side surface 40d of the plasmon generator 40, respectively. When the metal film 40P is etched, the top surface of the dielectric film 38C is also slightly etched in the portions thereof on both sides of the side surfaces 40Pc and 40Pd of the metal film 40P in the track width direction TW.

The metal film 40P may be etched such that the distance between the first and second side surfaces 40Pc and 40Pd in the second direction parallel to the evanescent light generating surface 37c and the medium facing surface 12a to be formed later (the Y direction) changes with distance from the evanescent light generating surface 37c, or such that the first and second side surfaces 40Pc and 40Pd become parallel to each other. FIG. 16B shows an example where the metal film 40P has been etched such that the distance between the first and second side surfaces 40Pc and 40Pd in the second direction (the Y direction) decreases with increasing distance from the evanescent light generating surface 37c.

Figure 17A:
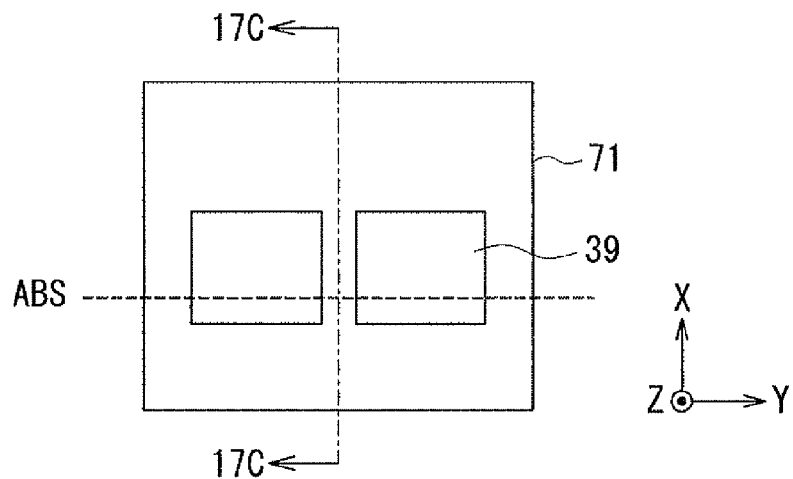
FIG. 17A to FIG. 17C are explanatory diagrams showing a step that follows the step shown in FIG. 16A to FIG. 16C.
Figure 17B:
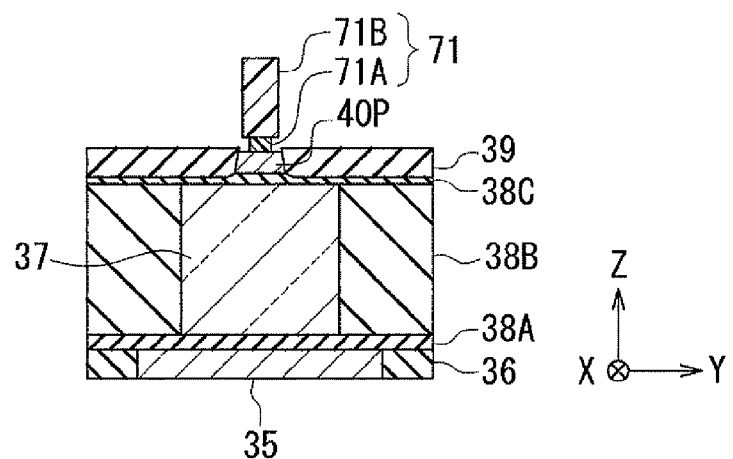
Figure 17C:
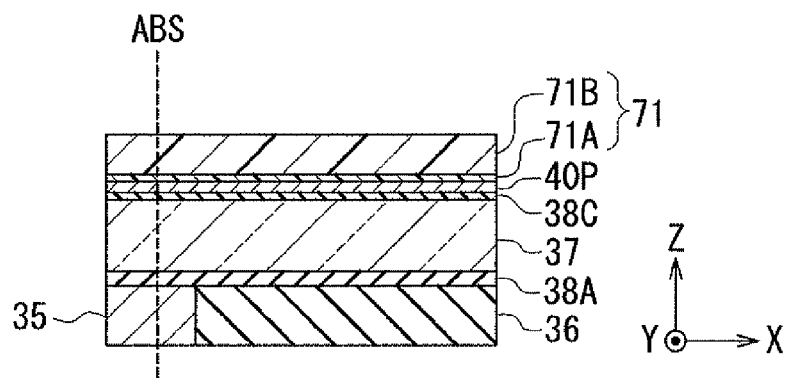

FIG. 17A to FIG. 17C show the next step. In this step, first, the dielectric layers 39 are formed to fill the etched portions of the metal film 40P. The dielectric layers 39 are formed such that their top surfaces are higher in level than the top surface of the metal film 40P. The mask 71 is then removed.

Figure 18A:
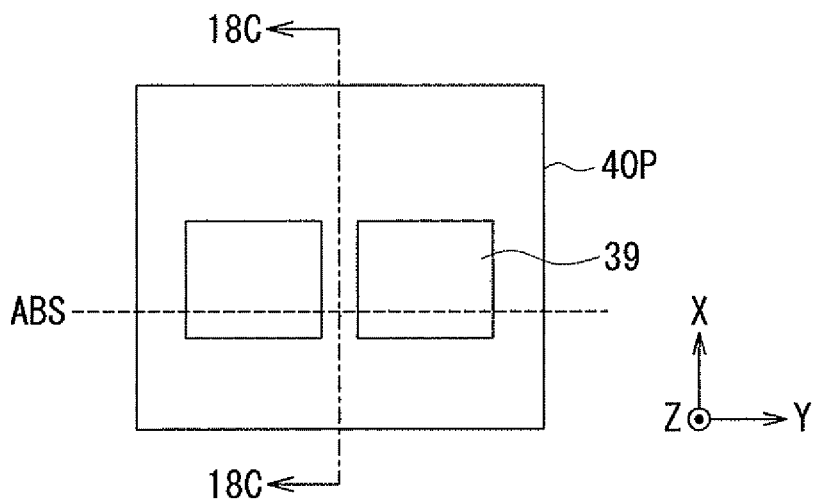
FIG. 18A to FIG. 18C are explanatory diagrams showing a step that follows the step shown in FIG. 17A to FIG. 17C.
Figure 18B:
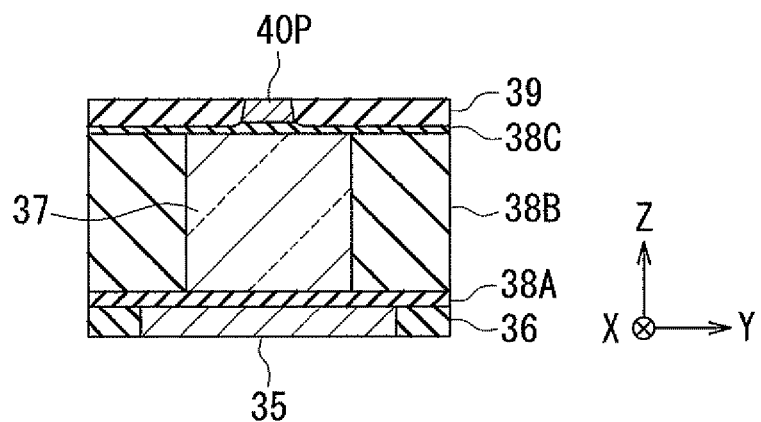
Figure 18C:
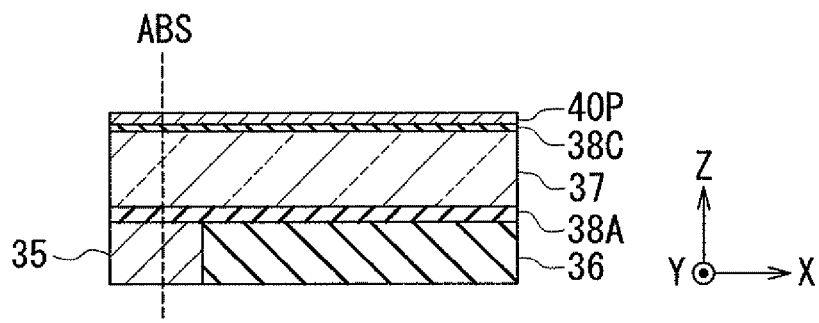

FIG. 18A to FIG. 18C show the next step. In this step, the top surface of the stack is slightly polished by, for example, CMP, so as to make the top surfaces of the metal film 40P and the dielectric layers 39 even with each other. This polishing step will remove any burrs that may have been produced on the top surface of the stack upon removal of the mask 71 in the previous step. This polishing step can be omitted if the top surface of the stack is flat to some extent when the mask 71 has been removed.

Figure 19A:
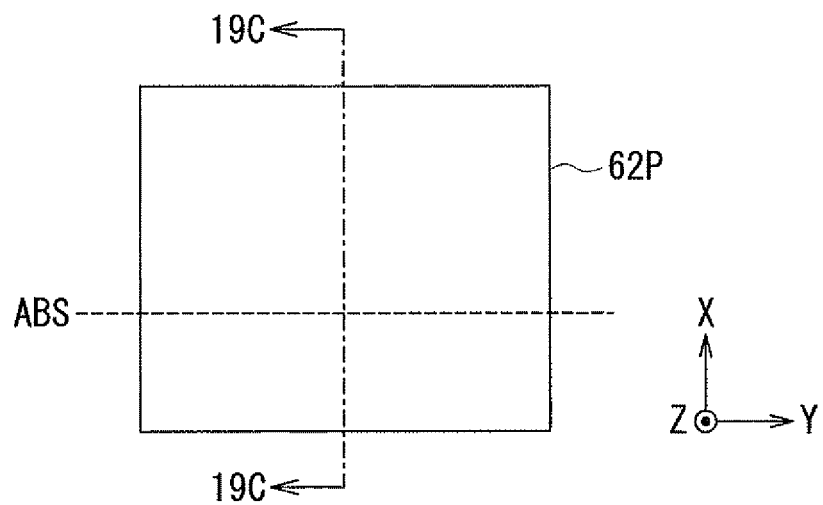
FIG. 19A to FIG. 19C are explanatory diagrams showing a step that follows the step shown in FIG. 18A to FIG. 18C.
Figure 19B:
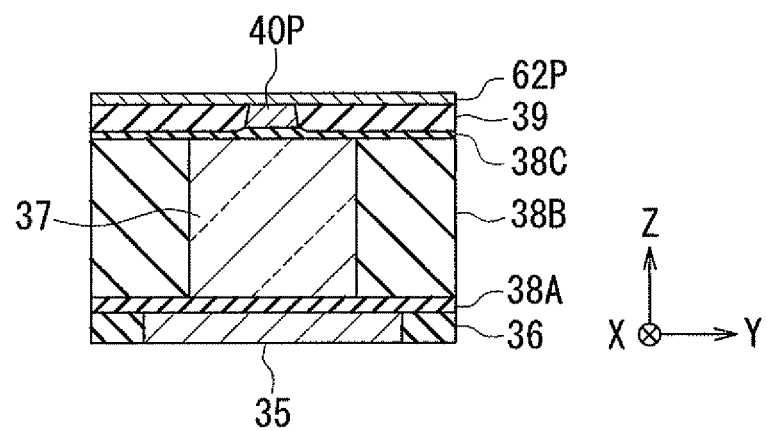
Figure 19C:
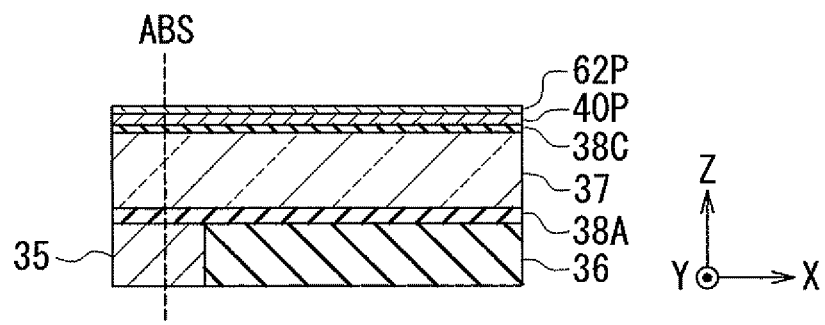

FIG. 19A to FIG. 19C show the next step. In this step, a metal film 62P is formed over the metal film 40P and the dielectric layers 39 by sputtering, for example. The metal film 62P is to later become the second layer 62 of the heat sink 60. Note that this step is not required if the second layer 62 is to be omitted.

Figure 20A:
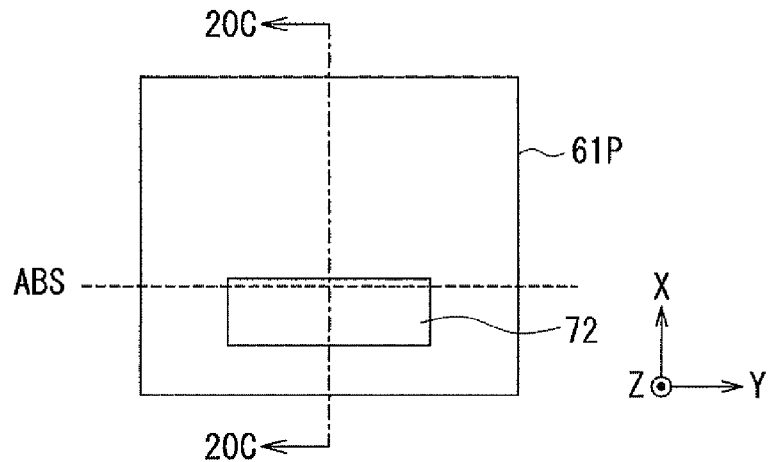
FIG. 20A to FIG. 20C are explanatory diagrams showing a step that follows the step shown in FIG. 19A to FIG. 19C.
Figure 20B:
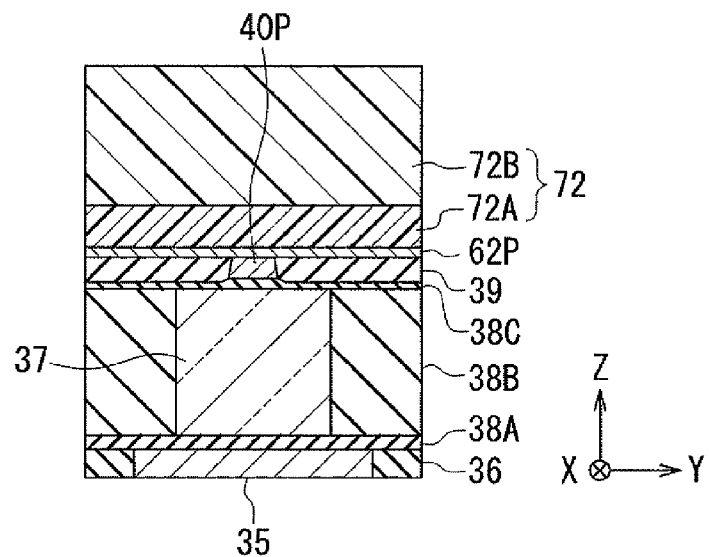
Figure 20C:
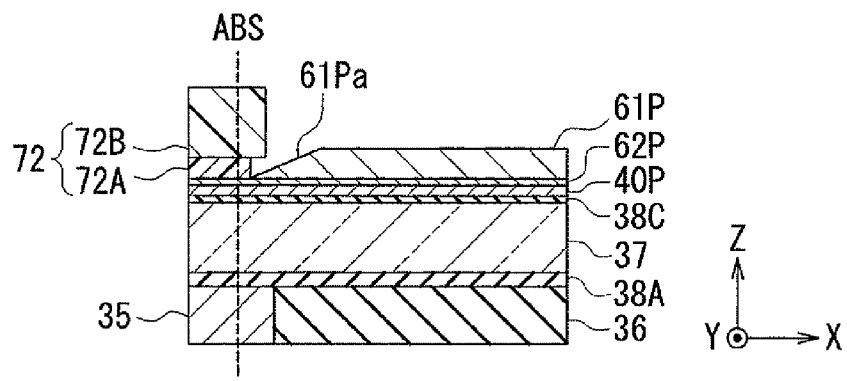
Figure 21A:
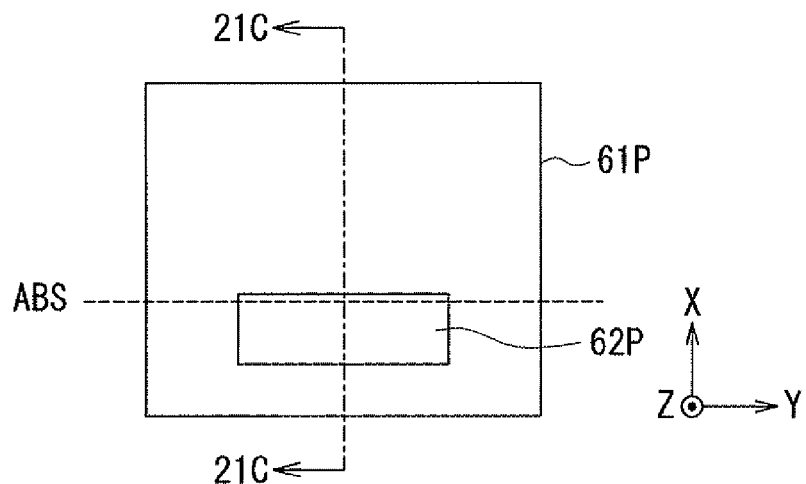
FIG. 21A to FIG. 21C are explanatory diagrams showing a step that follows the step shown in FIG. 20A to FIG. 20C.
Figure 21B:
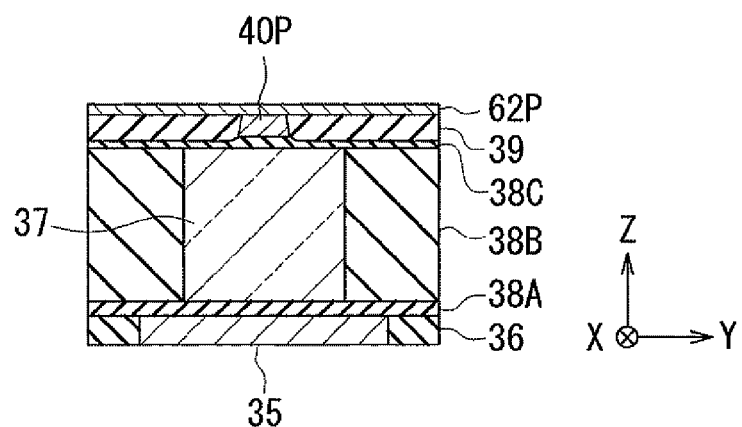
Figure 21C:
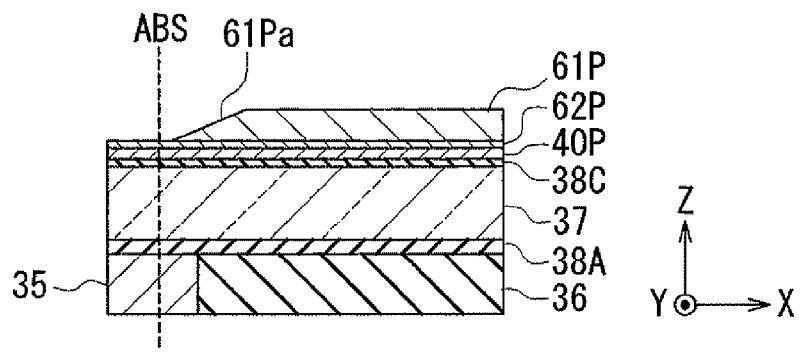

FIG. 20A to FIG. 20C show the next step. In this step, first, a mask 72 is formed to cover a portion of the metal film 62P in the vicinity of the position ABS. Like the mask 71, the mask 72 may consist of a lower layer 72A and an upper layer 72B and have an undercut shape. Next, a metal film 61P is formed on the metal film 62P. The metal film 61P is to later become the first layer 61 of the heat sink 60. The metal film 61P has a smaller thickness in the vicinity of the mask 72 due to the shadow cast by the mask 72. The metal film 61P thus has a sloped surface 61Pa that is to later become the sloped surface 61a. Next, the mask 72 is removed as shown in FIG. 21A to FIG. 21C.

Figure 22A:
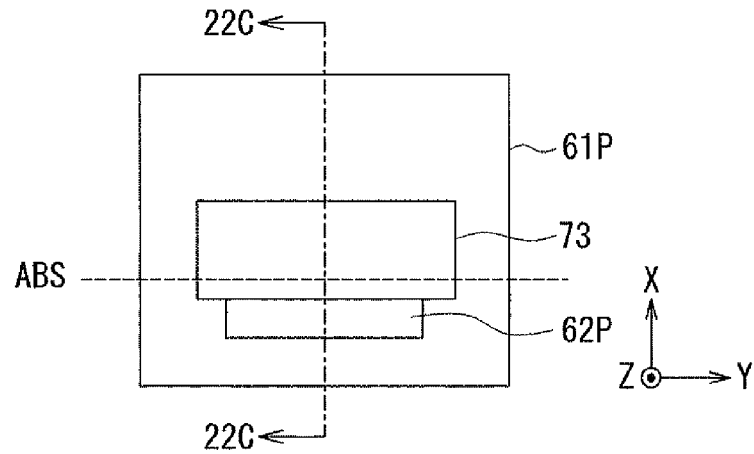
FIG. 22A to FIG. 22C are explanatory diagrams showing a step that follows the step shown in FIG. 21A to FIG. 21C.
Figure 22B:
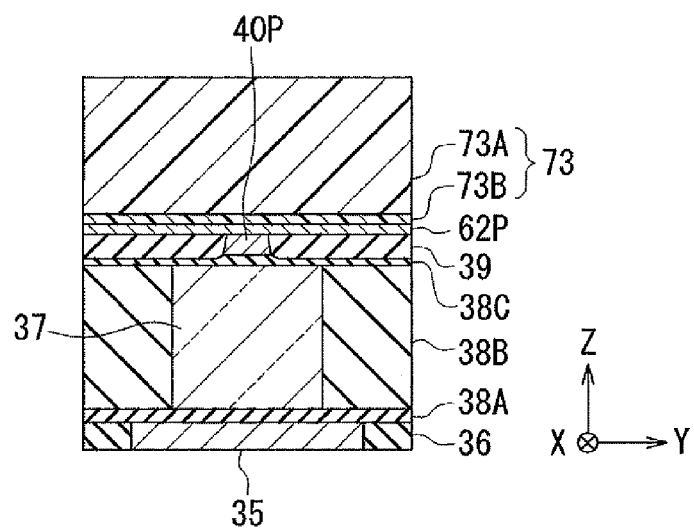
Figure 22C:
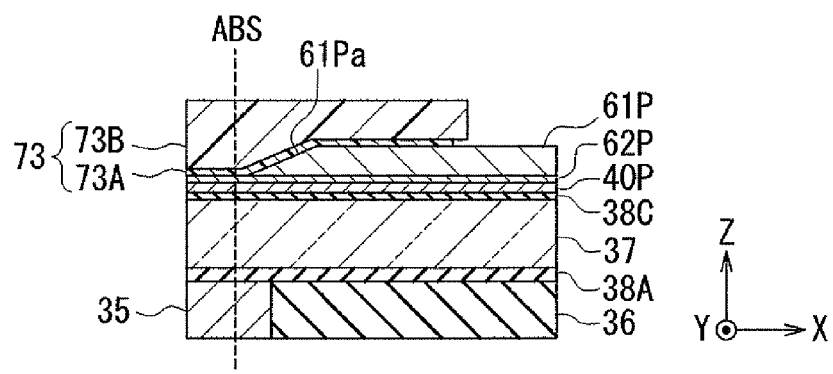

FIG. 22A to FIG. 22C show the next step. In this step, a mask 73 to be used for patterning the metal films 40P, 61P, and 62P is formed over the metal films 61P and 62P. Like the mask 71, the mask 73 may consist of a lower layer 73A and an upper layer 73B and have an undercut shape.

Figure 23A:
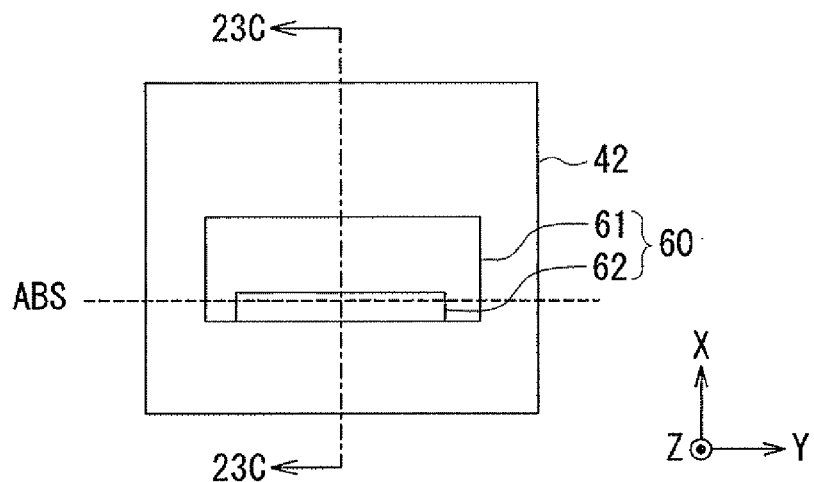
FIG. 23A to FIG. 23C are explanatory diagrams showing a step that follows the step shown in FIG. 22A to FIG. 22C.
Figure 23B:
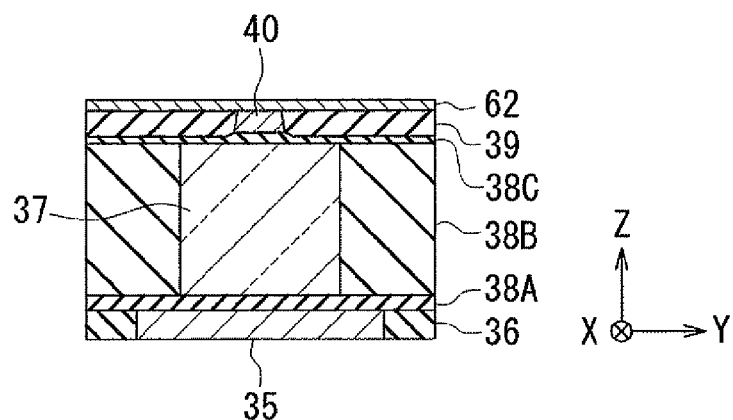
Figure 23C:
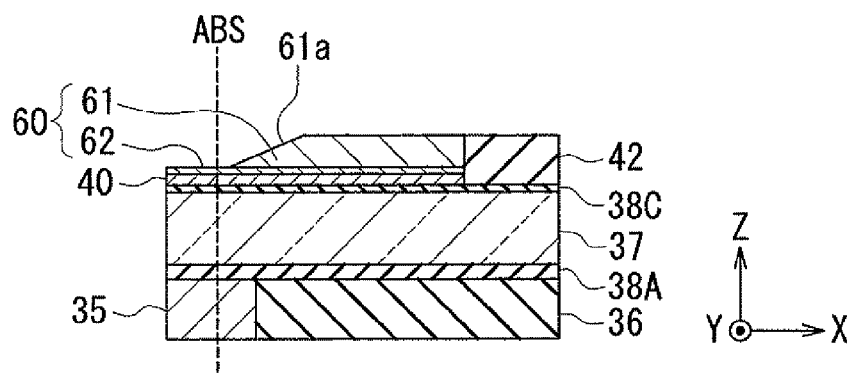

FIG. 23A to FIG. 23C show the next step. In this step, first, the metal films 40P, 61P, and 62P are patterned by, for example, ion milling using the mask 73 as an etching mask. This makes the remaining metal film 40P into the plasmon generator 40, the remaining metal film 61P into the first layer 61 of the heat sink 60, and the remaining metal film 62P into the second layer 62 of the heat sink 60. Next, the dielectric layer 42 is formed over the entire top surface of the stack. The mask 73 is then removed.

Figure 24A:
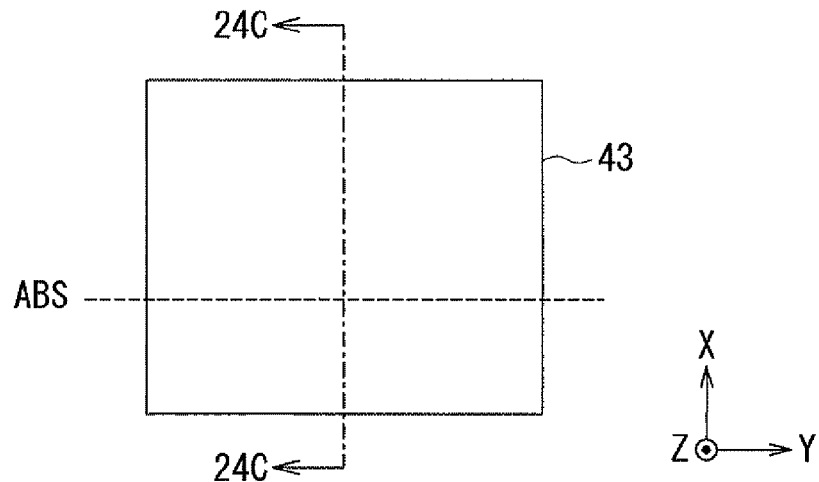
FIG. 24A to FIG. 24C are explanatory diagrams showing a step that follows the step shown in FIG. 23A to FIG. 23C.
Figure 24B:
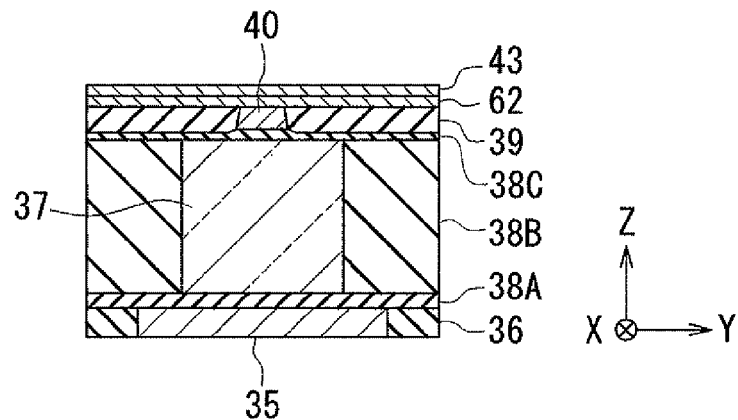
Figure 24C:
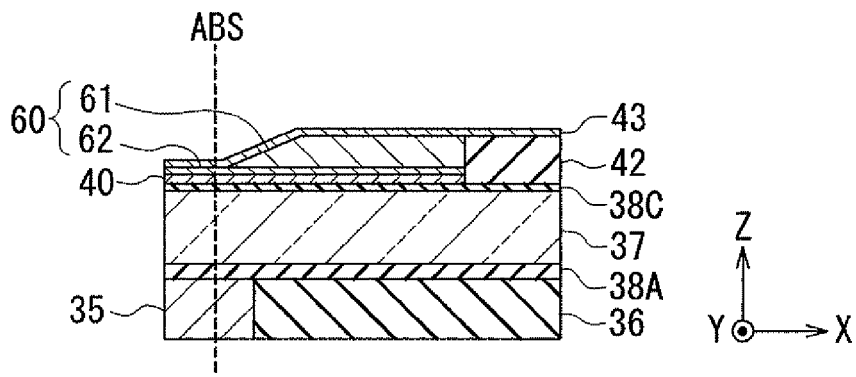

FIG. 24A to FIG. 24C show the next step. In this step, first, the nonmagnetic layer 43 is formed over the entire top surface of the stack. The thickness of the nonmagnetic layer 43 serves to control the distance between the position of occurrence of the write magnetic field in the magnetic pole 44 to be formed later and the near-field light generating part 40g of the plasmon generator 40. The dielectric film 38C, the dielectric layer 42, and the nonmagnetic layer 43 are then selectively etched to form therein openings for exposing the top surfaces of the third layers of the coupling portions 31A and 31B (see FIG. 9). Next, a not-shown electrode film to function as an electrode and a seed layer for plating is formed over the entire top surface of the stack.

Figure 25A:
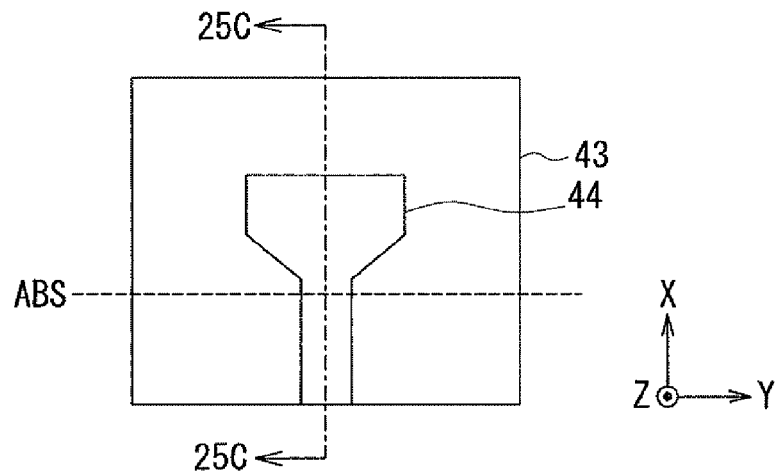
FIG. 25A to FIG. 25C are explanatory diagrams showing a step that follows the step shown in FIG. 24A to FIG. 24C.
Figure 25B:
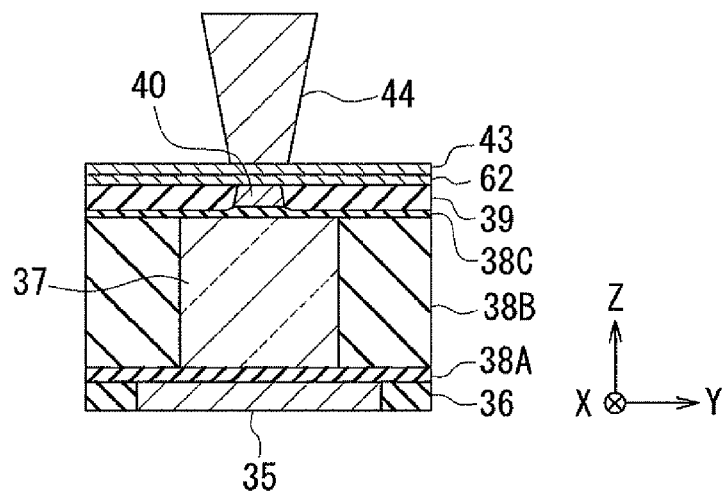
Figure 25C:
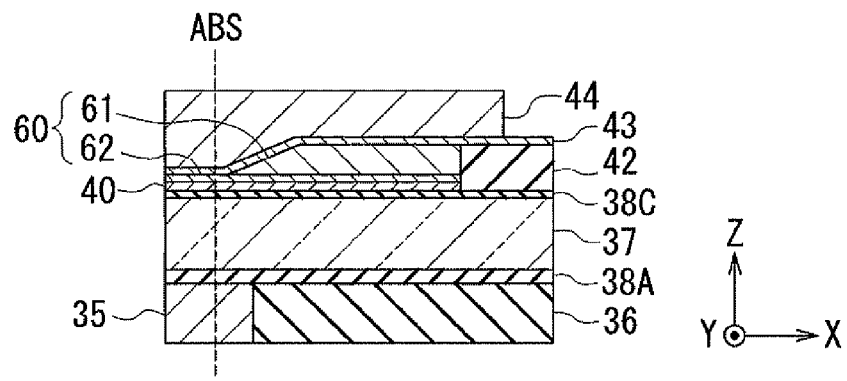

FIG. 25A to FIG. 25C show the next step. In this step, first, a not-shown frame for forming the magnetic pole 44 and the fourth layers of the coupling portions 31A and 31B is formed on the not-shown electrode film. The frame has openings in an area where the magnetic pole 44 is to be formed and an area where the fourth layers of the coupling portions 31A and 31B are formed. Next, the magnetic pole 44 and the fourth layers of the coupling portions 31A and 31B are formed in the openings of the frame by frame plating using the electrode film as the electrode and the seed layer. The frame is then removed.

Figure 26A:
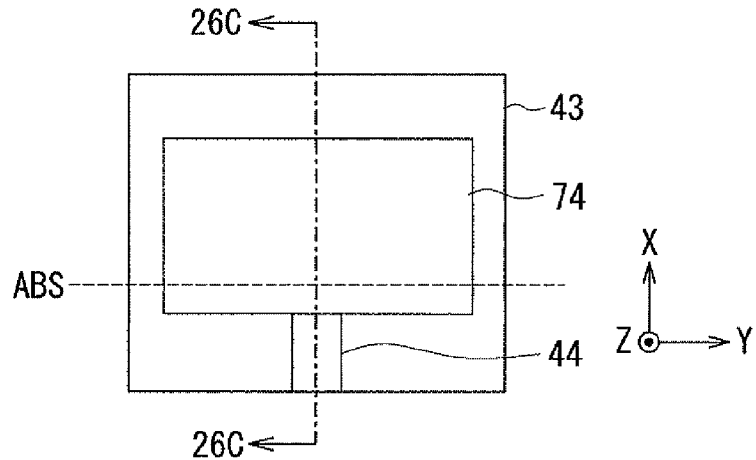
FIG. 26A to FIG. 26C are explanatory diagrams showing a step that follows the step shown in FIG. 25A to FIG. 25C.
Figure 26B:
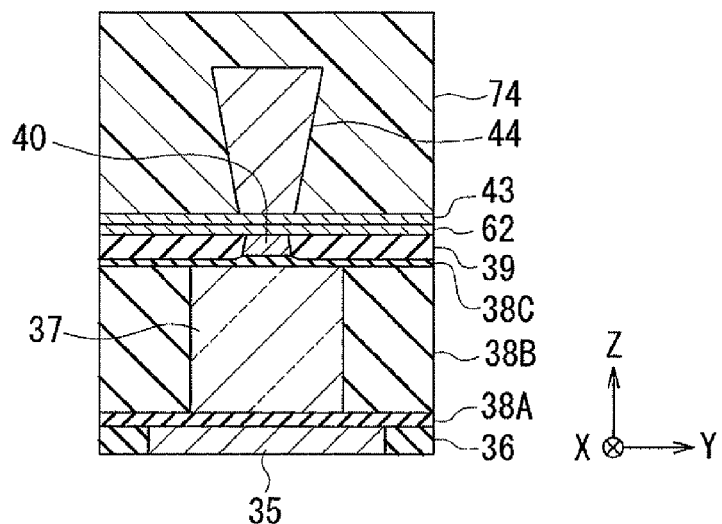
Figure 26C:
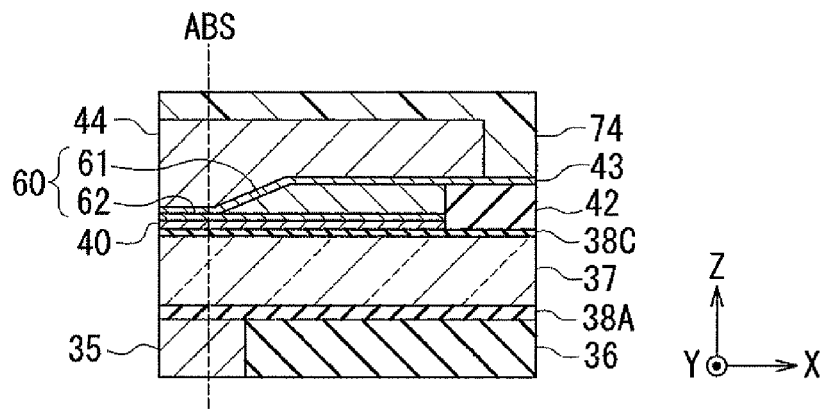

FIG. 26A to FIG. 26C show the next step. In this step, a photoresist mask 74 is formed to cover the magnetic pole 44. The photoresist mask 74 is formed by patterning a photoresist layer by photolithography. Note that the photoresist mask 74 need not necessarily cover a portion of the magnetic pole 44 that is to be removed later by polishing when the medium facing surface 12a is formed.

Figure 27A:
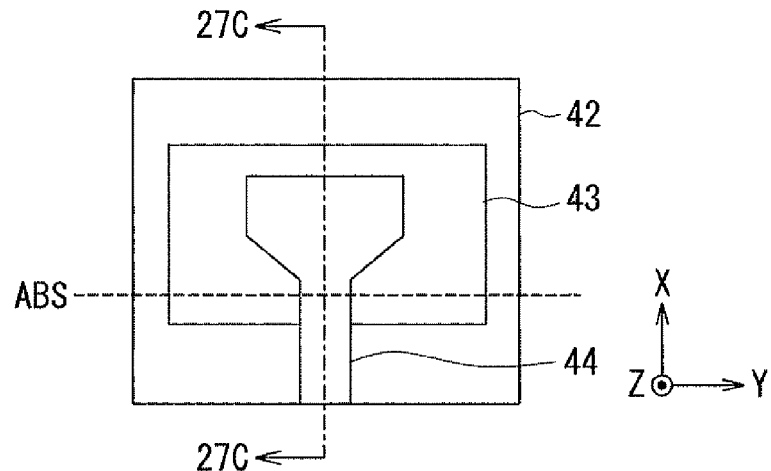
FIG. 27A to FIG. 27C are explanatory diagrams showing a step that follows the step shown in FIG. 26A to FIG. 26C.
Figure 27B:
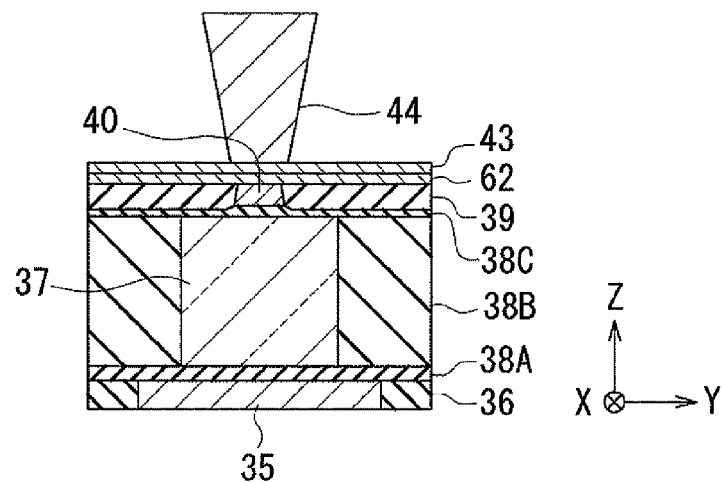
Figure 27C:
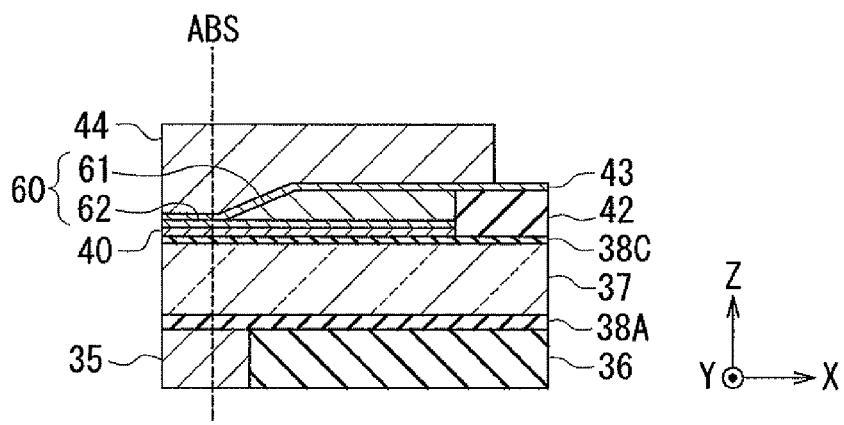

FIG. 27A to FIG. 27C show the next step. In this step, first, portions of the nonmagnetic layer 43 and the not-shown electrode film, other than the portions lying under the photoresist mask 74, the magnetic pole 44 and the fourth layers of the coupling portions 31A and 31B, are removed by, for example, ion milling using the photoresist mask 74, the magnetic pole 44 and the fourth layers of the coupling portions 31A and 31B as etching masks. The photoresist mask 74 is then removed.

Figure 28A:
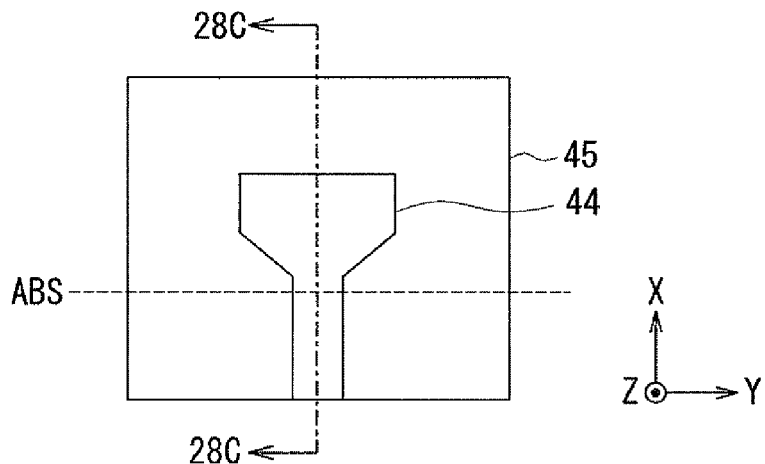
FIG. 28A to FIG. 28C are explanatory diagrams showing a step that follows the step shown in FIG. 27A to FIG. 27C.
Figure 28B:
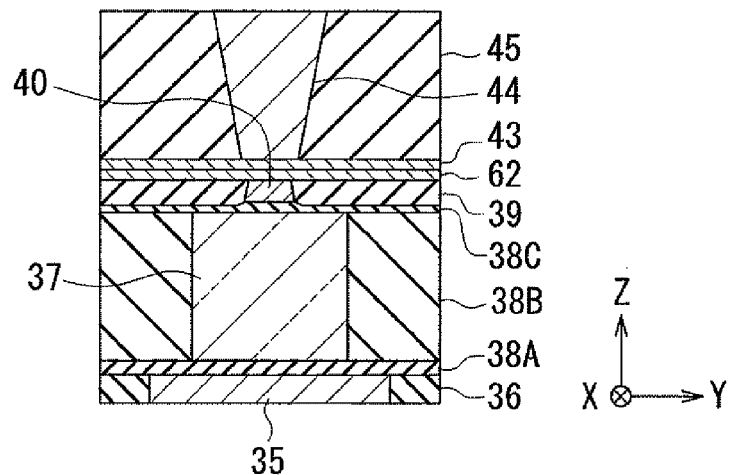
Figure 28C:
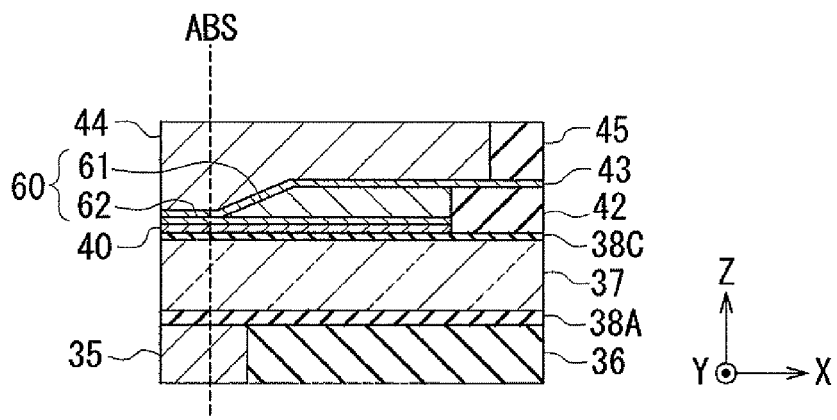

FIG. 28A to FIG. 28C show the next step. In this step, first, the insulating layer 45 is formed over the entire top surface of the stack. The insulating layer 45 is then polished by, for example, CMP, until the magnetic pole 44 and the fourth layers of the coupling portions 31A and 31B are exposed. The top surfaces of the magnetic pole 44, the fourth layers of the coupling portions 31A and 31B, and the insulating layer 45 are thereby made even with each other. Then, the layers from the coupling layers 46, 47 to the protective layer 17 are formed one by one.

The method of manufacturing the thermally-assisted magnetic recording head 1 according to the embodiment, which includes the step of fabricating the substructure described above, particularly includes the steps of forming the core 37 and part of the cladding (the cladding layer 38B) such that the evanescent light generating surface 37c is exposed; forming the dielectric film 38C on the evanescent light generating surface 37c, the dielectric film 38C forming the gap part 38Ca; forming the plasmon generator 40 on the dielectric film 38C; and forming the magnetic pole 44 after the plasmon generator 40 is formed.

The effects of the thermally-assisted magnetic recording head 1 according to the embodiment will now be described in comparison with thermally-assisted magnetic recording heads of first and second comparative examples. The thermally-assisted magnetic recording head of the first comparative example will be described first. The thermally-assisted magnetic recording head of the first comparative example has the structure described in U.S. Patent Application Publication No. 2011/0058272 A1, that is, the structure achieved by forming a groove in the dielectric layer disposed above the top surface of the core (the evanescent light generating surface) such that the groove is V-shaped in cross section parallel to the medium facing surface, and then forming the dielectric film, the plasmon generator, and part of the magnetic pole in this order in the groove.

In the first comparative example, the plasmon generator has two sloped surfaces that form a V-shape in a cross section parallel to the medium facing surface, and an edge part formed by the two sloped surfaces intersecting each other. The edge part faces toward the top surface of the core, with a gap of a predetermined size interposed between the edge part and the top surface of the core. An end of the edge part located in the medium facing surface serves as the near-field light generating part. In the first comparative example, evanescent light occurs from the top surface of the core, and surface plasmons are excited at least on the edge part of the plasmon generator through coupling with the evanescent light.

The first comparative example has the first and second problems described previously. The first problem is that in the plasmon generator, the surface plasmons are distributed to extend from the edge part to a portion of each of the two sloped surfaces located in the vicinity of the edge part, and this results in an increase in spot diameter of the near-field light on the magnetic disk 201, thus making it difficult to reduce the track width. The second problem is that the distance between the edge part of the plasmon generator and the top surface of the core varies greatly from one head to another, and as a result, the efficiency of transformation of the light propagating through the core into near-field light varies greatly from one head to another.

In contrast to this, the embodiment is configured so that the plasmon generator 40 has the flat surface 40b, and surface plasmons are excited on the flat surface 40b. The plasmon generator 40 is capable of confining the surface plasmons within a narrower range as compared the plasmon generator of the first comparative example. Consequently, according to the embodiment, it is possible to make the near-field light smaller in spot diameter on the magnetic disk 201 as compared with the case with the first comparative example.

Furthermore, in the embodiment, the flat surface 40b of the plasmon generator 40 faces toward the evanescent light generating surface 37c of the core 37, and the gap part 38Ca is interposed between the flat surface 40b and the evanescent light generating surface 37c. This structure provides reduced variations in the distance between the flat surface 40b and the evanescent light generating surface 37c. The reason for this will be described below. The plasmon generator 40 is formed as follows. First, the core 37 and part of the cladding (the cladding layer 38B) are formed such that the evanescent light generating surface 37c is exposed. Then, the dielectric film 38C is formed on the evanescent light generating surface 37c, and the plasmon generator 40 is formed on the dielectric film 38C. The distance between the flat surface 40b and the evanescent light generating surface 37c is defined by the thickness of the dielectric film 38C. In the embodiment, the dielectric film 38C is formed by physical vapor deposition such as sputtering, in particular. The thickness of the dielectric film 38C formed in this manner varies less compared with the position and shape of the bottom of a groove formed by etching. Accordingly, as compared with the first comparative example, the embodiment makes it possible to reduce variations in the distance between the surface of the core 37 (the evanescent light generating surface 37c) and the surface of the plasmon generator 40 (the flat surface 40b) from one head to another.

The thermally-assisted magnetic recording head of the second comparative example will now be described. The thermally-assisted magnetic recording head of the second comparative example is configured so that the core of the waveguide is located forward of the plasmon generator in the direction of travel of the magnetic recording medium. In the second comparative example, the magnetic pole may be located either backward or forward of the plasmon generator in the direction of travel of the magnetic recording medium. Where the magnetic pole is located forward of the plasmon generator in the direction of travel of the magnetic recording medium, the magnetic pole lies between the front end face of the core and the medium facing surface. In the second comparative example, the bottom surface of the core facing toward the plasmon generator serves as the evanescent light generating surface. The plasmon generator of the second comparative example has the same shape as that of the plasmon generator 40 according to the embodiment, but the attitude thereof inside the thermally-assisted magnetic recording head is upside down to that of the plasmon generator 40 according to the embodiment shown in FIG. 1 and FIG. 2. The flat surface of the plasmon generator of the second comparative example faces toward the bottom surface of the core, and there is a gap of a predetermined size between the flat surface and the bottom surface of the core. In the second comparative example, evanescent light occurs from the bottom surface of the core, and surface plasmons are excited on the flat surface of the plasmon generator through coupling with the evanescent light.

When the second comparative example is configured so that the magnetic pole is interposed between the front end face of the core and the medium facing surface, there arises the problem that the magnetic pole absorbs part of the light propagating through the core and part of the surface plasmons excited on the flat surface of the plasmon generator, thereby reducing the use efficiency of the light propagating through the core.

In contrast to this, the embodiment makes it possible to prevent part of the light propagating through the core from being absorbed by the magnetic pole 44 because the plasmon generator 40 is disposed between the core 37 and the magnetic pole 44. Furthermore, the flat surface 40b of the plasmon generator 40 faces away from the magnetic pole 44. It is thus possible to prevent the surface plasmons excited on the flat surface 40b from being absorbed in part by the magnetic pole 44.

The plasmon generator of the second comparative example is formed in the following manner, for example. First, formed is a metal film that is to be etched later into the plasmon generator. On this metal film, formed is a mask whose planar shape corresponds to the planar shape of the plasmon generator. Using the mask as an etching mask, the metal film is then patterned by etching so that the metal film becomes the plasmon generator.

The plasmon generator formed in this manner tends to have such a shape that the distance between the first and second side surfaces decreases with increasing proximity to the flat surface, i.e., the top end. In this case, since the flat surface is small in width in the second direction (the Y direction), the width of the flat surface varies greatly when the thermally-assisted magnetic recording heads are mass-produced. In an extreme case, the plasmon generator may have a triangular shape when viewed in a direction parallel to the medium facing surface, so that the top end of the plasmon generator will form an edge instead of the flat surface. In this case, the position of the edge of the plasmon generator should vary in response to variations in the shape of the plasmon generator. Thus, in the second comparative example, the position and shape of the top end (the flat surface or the edge) of the plasmon generator vary greatly when the thermally-assisted magnetic recording heads are mass-produced. This causes increased variations in the distance between the top end of the plasmon generator and the bottom surface of the core from one head to another.

In contrast to this, according to the embodiment, the metal film 40P is formed on the dielectric film 38C and then patterned by etching so that the metal film 40P becomes the plasmon generator 40. A portion of the bottom surface of the metal film 40P that is to later become the flat surface 40b of the plasmon generator 40 is in contact with the dielectric film 38C. Thus, even if the metal film 40P is etched to form the plasmon generator 40, there will occur little variations in the position and shape of the flat surface 40b from one head to another. Consequently, the embodiment makes it possible to reduce variations in the distance between the surface of the core 37 (the evanescent light generating surface 37c) and the surface of the plasmon generator 40 (the flat surface 40b) as compared with the second comparative example.

As can be seen from the foregoing, it is possible according to the embodiment to prevent part of the light propagating through the core 37 from being absorbed by the magnetic pole 44, to make the near-field light smaller in spot diameter on the magnetic disk 201, and to reduce variations in the distance between the surface of the core 37 (the evanescent light generating surface 37c) and the surface of the plasmon generator 40 (the flat surface 40b) from one head to another. It is thus possible to reduce variations in the efficiency of transformation of the light propagating through the core 37 into near-field light from one head to another.

Furthermore, the embodiment allows the magnetic pole 44 to be formed with higher accuracy as compared with the first comparative example. This will be described in detail below. The magnetic pole 44 is required to produce an intense write magnetic field and exhibit a steep gradient of the change in write magnetic field in the track width direction TW. To achieve this, the embodiment is configured so that the magnetic pole 44 is shaped to have the track width defining portion 441 and the wide portion 442. The track width defining portion 441 has the first end located in the medium facing surface 12a and the second end opposite to the first end. The wide portion 442 is connected to the second end of the track width defining portion 441 and is greater in width than the track width defining portion. The first end of the track width defining portion 441 is small in width.

In the first comparative example, a groove that is V-shaped in cross section parallel to the medium facing surface is formed in the dielectric layer disposed above the top surface of the core and, in this groove, the dielectric film and the plasmon generator are formed and thereafter the magnetic pole is formed by frame plating such that part of the magnetic pole is disposed in the groove. In this case, a frame that is formed of a photoresist layer patterned by photolithography is formed on an underlayer including the groove. Then, the magnetic pole is formed by plating within this frame. In the first comparative example, a portion of the frame corresponding to the track width defining portion particularly tends to become distorted in shape because light for exposure is reflected off the inclined surfaces of the groove while the photoresist layer is being exposed to the light. This makes it difficult to form the track width defining portion of the magnetic pole with high accuracy.

In contrast to this, according to the embodiment, the top surfaces of the metal film 40P and the dielectric layers 39 are made even and then the heat sink 60, the dielectric layer 42, and the nonmagnetic layer 43 are formed in this order. After that, the magnetic pole 44 is formed by frame plating. As such, in the embodiment, the magnetic pole 44 is formed by frame plating on an underlayer having no groove. It is thus possible according to embodiment to form the track width defining portion 441 with high accuracy.

Now, a description will be given of preferred shapes of the plasmon generator 40 according to the embodiment and the effects provided thereby. The plasmon generator 40 according to the embodiment is preferably of the shape of the first example shown in FIG. 4 or the second example shown in FIG. 5. The shape of the first example is such that the distance between the first and second side surfaces 40c and 40d in the second direction parallel to the evanescent light generating surface 37c and the medium facing surface 12a (the Y direction) decreases with increasing distance from the evanescent light generating surface 37c. The shape of the second example is such that the distance between the first and second side surfaces 40c and 40d in the second direction (the Y direction) is constant regardless of the distance from the evanescent light generating surface 37c, that is, the first and second side surfaces 40c and 40d are parallel to each other.

In addition to the shapes of the first and second examples described above, the following shape of a third example is also acceptable for the plasmon generator 40. The shape of the third example is such that the distance between the first and second side surfaces 40c and 40d in the second direction (the Y direction) increases with increasing distance from the evanescent light generating surface 37c. The shape of the third example makes the flat surface 40b smaller than the top surface 40e in width in the second direction (the Y direction). As will be described below, the shape of the third example has the problem that it is more difficult to define the position and shape of the flat surface 40b with high accuracy when compared with the shapes of the foregoing first and second examples.

To form the plasmon generator 40 of the shape of the third example, the following first and second methods can be conceivably employed. In the first method, as in the first comparative example, a groove is formed in the dielectric layer disposed above the evanescent light generating surface 37c of the core 37, and then the plasmon generator 40 is formed in the groove. A cross section of the groove parallel to the medium facing surface 12a is of the shape of a trapezoid in which the lower base closer to the evanescent light generating surface 37c is shorter than the upper base. In the second method, the metal film 40P is formed and then patterned by etching so that the metal film 40P becomes the plasmon generator 40 of the shape of the third example.

In the first method, since the bottom of the groove is small in width in the second direction (the Y direction), the width of the bottom of the groove tends to vary a great deal. Accordingly, the flat surface 40b tends to vary greatly in width in the second direction (the Y direction). In an extreme case, the plasmon generator 40 may have a triangular shape when viewed in a direction parallel to the medium facing surface 12a, so that the bottom end of the plasmon generator 40 will form an edge instead of the flat surface 40b. In this case, the position of the edge of the plasmon generator 40 should vary in response to variations in the shape of the plasmon generator 40. Thus, when the first method is employed to form the plasmon generator 40 of the shape of the third example, it is difficult to define the position and shape of the flat surface 40b with high accuracy.

When the second method is employed to form the plasmon generator 40 of the shape of the third example, the flat surface 40b also tends to vary greatly in width in the second direction (the Y direction), and in an extreme case, the plasmon generator 40 may also have a triangular shape when viewed in a direction parallel to the medium facing surface 12a, so that the bottom end of the plasmon generator 40 will form an edge instead of the flat surface 40b. Thus, in this case also, it is difficult to define the position and shape of the flat surface 40b with high accuracy.

In contrast to this, when the plasmon generator 40 is of the shape of the first or second example, the width of the flat surface 40b in the second direction (the Y direction) is equal to or greater than that of the top surface 40e. In this case, the problem with the formation of the plasmon generator 40 of the shape of the third example will not arise, so that it is possible to define the position and shape of the flat surface 40b with high accuracy. Thus, the plasmon generator 40 is preferably of the shape of the first or second example, more preferably the shape of the first example.

When the plasmon generator 40 is of the shape of the first example, top surface 40e is smaller than the flat surface 40b in width in the second direction (the Y direction). Accordingly, the width of the top surface 40e tends to vary greatly, and in an extreme case, the plasmon generator 40 may have a triangular shape when viewed in a direction parallel to the medium facing surface 12a, so that the top end of the plasmon generator 40 will form an edge instead of the top surface 40e. In this case, the top end (the top surface 40e or the edge) of the plasmon generator 40 may vary a great deal in response to variations in the shape of the plasmon generator 40. In the embodiment, however, even when the top end (the top surface 40e or the edge) of the plasmon generator 40 varies greatly, this will not affect the distance between the flat surface 40b and the evanescent light generating surface 37c and the efficiency of transformation of the light propagating through the core 37 into near-field light.

The other effects of the embodiment will now be described. In the embodiment, the magnetic path forming section constituted of the leading shield layer 35, the coupling layer 30, the return shield layer 28, the coupling portions 31A and 31B, the coupling layer 47, the yoke layer 51, and the coupling layer 46 has an end face (composed of the end faces of the return shield layer 28, the coupling layer 30 and the leading shield layer 35) located in the medium facing surface 12a. In the medium facing surface 12a, the end face of the magnetic path forming section is disposed such that the front end face 40a of the plasmon generator 40 is interposed between the end face of the magnetic path forming section and the end face 44a of the magnetic pole 44. According to the embodiment, it is thus possible to attract the magnetic flux emerged from the end face 44a of the magnetic pole 44 toward the plasmon generator 40, and to thereby make the spot of the near-field light close to the peak of the write magnetic field.

Furthermore, in the embodiment, the heat sink 60 is provided between the plasmon generator 40 and the magnetic pole 44. The embodiment thereby makes it possible to cool the plasmon generator 40 and suppress a temperature rise of the plasmon generator 40.

The first layer 61 of the heat sink 60 has the sloped surface 61a facing toward the magnetic pole 44, and the distance between the sloped surface 61a and the flat surface 40b of the plasmon generator 40 in the third direction perpendicular to the evanescent light generating surface 37c (the Z direction) decreases with increasing proximity to the medium facing surface 12a. Thus, at a location farther from the medium facing surface 12a than is the sloped surface 61a, the distance between the flat surface 40b and the magnetic pole 44 and the distance between the evanescent light generating surface 37c and the magnetic pole 44 are increased. According to the embodiment, it is thus possible to prevent the surface plasmons excited on the flat surface 40b from being absorbed in part by the magnetic pole 44 and prevent the light propagating through the core 37 from being absorbed in part by the magnetic pole 44.

The present invention is not limited to the foregoing embodiment, and various modifications may be made thereto. For example, the first and second side surfaces 40c and 40d of the plasmon generator 40 may each include a curved portion.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A thermally-assisted magnetic recording head comprising:
    a medium facing surface that faces a magnetic recording medium;
    a magnetic pole that has an end face located in the medium facing surface and produces a write magnetic field for writing data on the magnetic recording medium;
    a waveguide including a core and a cladding, the core allowing light to propagate therethrough; and
    a plasmon generator, wherein:
    the magnetic pole is located forward of the core in a direction of travel of the magnetic recording medium;
    the plasmon generator is disposed between the core and the magnetic pole;
    the core has an evanescent light generating surface that generates evanescent light based on the light propagating through the core, the evanescent light generating surface facing toward the plasmon generator;
    the plasmon generator has: a front end face located in the medium facing surface; a flat surface connected to the front end face and facing toward the evanescent light generating surface; and a first side surface and a second side surface that are at a distance from each other and are located farther from the evanescent light generating surface than is the flat surface;
    the front end face includes a near-field light generating part that generates near-field light;

the flat surface is shaped like a band, parallel to the evanescent light generating surface and elongated in a first direction perpendicular to the medium facing surface, the flat surface having a first edge and a second edge that are opposite to each other in a second direction parallel to the evanescent light generating surface and the medium facing surface;

the entirety of the flat surface extends parallel to the first direction;

the first side surface is connected to the first edge;

the second side surface is connected to the second edge;

the cladding includes a gap part located between the evanescent light generating surface and the flat surface; and the plasmon generator is configured so that a surface plasmon is excited on the flat surface through coupling with the evanescent light generated from the evanescent light generating surface, the surface plasmon propagates along the flat surface to the near-field light generating part, and the near-field light generating part generates the near-field light based on the surface plasmon.

2. The thermally-assisted magnetic recording head according to claim 1, wherein the first side surface and the second side surface decrease in distance from each other in the second direction with increasing distance from the evanescent light generating surface.

3. The thermally-assisted magnetic recording head according to claim 1, wherein the first side surface and the second side surface are parallel to each other.

4. The thermally-assisted magnetic recording head according to claim 1, wherein:

the front end face of the plasmon generator is, quadrilateral in shape and has a first side located closest to the evanescent light generating surface, a second side located farthest from the evanescent light generating surface, and a third side and a fourth side connecting the first and second sides to each other;

the first side has a length of 15 to 50 nm;

the second side has a length equal to or smaller than the length of the first side;

an angle formed between the first side and the third side and an angle formed between the first side and the fourth side fall within the range of 45° to 90°; and the front end face has a length of 20 to 40 nm in a third direction perpendicular to the evanescent light generating surface.

5. The thermally-assisted magnetic recording head according to claim 1, further comprising a magnetic path forming section that is made of a magnetic material and connected to the magnetic pole so as to form a magnetic path in conjunction with the magnetic pole, wherein the magnetic path forming section has an end face that is located in the medium facing surface such that the front end face of the plasmon generator is interposed between the end face of the magnetic path forming section and the end face of the magnetic pole.

6. The thermally-assisted magnetic recording head according to claim 1, further comprising a heat sink disposed between the plasmon generator and the magnetic pole.

7. The thermally-assisted magnetic recording head according to claim 6, wherein the heat sink is made of a material the same as that of the plasmon generator, and is in contact with the plasmon generator.

8. The thermally-assisted magnetic recording head according to claim 6, wherein the heat sink has a sloped surface that faces toward the magnetic pole, and a distance between the sloped surface and the flat surface of the plasmon generator in the third direction perpendicular to the evanescent light generating surface decreases with increasing proximity to the medium facing surface.

9. A method of manufacturing the thermally-assisted magnetic recording head of claim 1, comprising the steps of:

forming the core and part of the cladding such that the evanescent light generating surface is exposed;

forming on the evanescent light generating surface a dielectric film that forms the gap part;

forming the plasmon generator on the dielectric film; and forming the magnetic pole after the plasmon generator is formed.

10. The method of manufacturing the thermally-assisted magnetic recording head according to claim 9, wherein the plasmon generator is formed such that the first side surface and the second side surface decrease in distance from each other in the second direction with increasing distance from the evanescent light generating surface.

11. The method of manufacturing the thermally-assisted magnetic recording head according to claim 9, wherein the plasmon generator is formed such that the first side surface and the second side surface are parallel to each other.

12. The method of manufacturing the thermally-assisted magnetic recording head according to claim 9, wherein the step of forming the core and part of the cladding includes the step of evening the evanescent light generating surface and a top surface of the part of the cladding located therearound.

13. The method of manufacturing the thermally-assisted magnetic recording head according to claim 9, wherein the dielectric film is formed by physical vapor deposition.

14. The method of manufacturing the thermally-assisted magnetic recording head according to claim 9, wherein the step of forming the plasmon generator includes the steps of: forming a metal film on the dielectric film; and patterning the metal film by etching so that the metal film becomes the plasmon generator.

15. A head gimbal assembly comprising the thermally-assisted magnetic recording head according to claim 1, and a suspension that supports the thermally-assisted magnetic recording head.

16. A magnetic recording device comprising:

a magnetic recording medium; the thermally-assisted magnetic recording head according to claim 1; and a positioning device that supports the thermally-assisted magnetic recording head and positions the thermally-assisted magnetic recording head with respect to the magnetic recording medium.

17. A thermally-assisted magnetic recording head comprising:

a medium facing surface that faces a magnetic recording medium;

a magnetic pole that has an end face located in the medium facing surface and produces a write magnetic field for writing data on the magnetic recording medium;

a waveguide including a core and a cladding, the core allowing light to propagate therethrough; and a plasmon generator, wherein:

the magnetic pole is located forward of the core in a direction of travel of the magnetic recording medium;

the plasmon generator is disposed between the core and the magnetic pole;

the core has an evanescent light generating surface that generates evanescent light based on the light propagating through the core, the evanescent light generating surface facing toward the plasmon generator;

the plasmon generator has: a front end face located in the medium facing surface; a flat surface facing toward the evanescent light generating surface; and a first side surface and a second side surface that are at a distance from each other and are located farther from the evanescent light generating surface than is the flat surface;

the front end face includes a near-field light generating part that generates near-field light;

the flat surface is shaped like a band, parallel to the evanescent light generating surface and elongated in a first direction perpendicular to the medium facing surface, the flat surface having a first edge and a second edge that are opposite to each other in a second direction parallel to the evanescent light generating surface and the medium facing surface;

the first side surface is connected to the first edge;

the second side surface is connected to the second edge;

the cladding includes a gap part located between the evanescent light generating surface and the flat surface;

the plasmon generator is configured so that a surface plasmon is excited on the flat surface through coupling with the evanescent light generated from the evanescent light generating surface, the surface plasmon propagates along the flat surface to the near-field light generating part, and the near-field light generating part generates the near-field light based on the surface plasmon;

the front end face of the plasmon generator is quadrilateral in shape and has a first side located closest to the evanescent light generating surface, a second side located farthest from the evanescent light generating surface, and a third side and a fourth side connecting the first and second sides to each other;

the first side has a length of 15 to 50 nm;

the second side has a length equal to or smaller than the length of the first side;

an angle formed between the first side and the third side and an angle formed between the first side and the fourth side fall within the range of 45° to 90°; and the front end face has a length of 20 to 40 nm in a third direction perpendicular to the evanescent light generating surface.

* * * * *